US011227279B2

(12) United States Patent
Chen et al.

(10) Patent No.: US 11,227,279 B2
(45) Date of Patent: Jan. 18, 2022

(54) CREDIT PAYMENT METHOD AND APPARATUS BASED ON CARD EMULATION OF MOBILE TERMINAL

(71) Applicant: Advanced New Technologies Co., Ltd., George Town (KY)

(72) Inventors: Xing Chen, Shanghai (CN); Lei Wang, Hangzhou (CN); Yuebin Shen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 59 days.

(21) Appl. No.: 16/043,417

(22) Filed: Jul. 24, 2018

(65) Prior Publication Data

US 2018/0330360 A1 Nov. 15, 2018

Related U.S. Application Data

(63) Continuation of application No. PCT/CN2017/071254, filed on Jan. 16, 2017.

(30) Foreign Application Priority Data

Jan. 25, 2016 (CN) .......................... 201610051643.8

(51) Int. Cl.
*G06Q 20/32* (2012.01)
*G06Q 20/34* (2012.01)
(Continued)

(52) U.S. Cl.
CPC ......... *G06Q 20/3227* (2013.01); *G06Q 20/24* (2013.01); *G06Q 20/32* (2013.01);
(Continued)

(58) Field of Classification Search
None
See application file for complete search history.

(56) References Cited

U.S. PATENT DOCUMENTS 6,463,534 B1 10/2002 Geiger et al.
7,945,670 B2 5/2011 Nakamura et al.
(Continued)

FOREIGN PATENT DOCUMENTS

CN 101364329 2/2009
CN 101778381 7/2010
(Continued)

OTHER PUBLICATIONS

International Search Report Issued by the International Searching Authority in International Application No. PCT/CN2017/071254 dated Apr. 19, 2017; 9 pages.
(Continued)

*Primary Examiner* — Jamie R Kucab
*Assistant Examiner* — Nicholas K Phan
(74) *Attorney, Agent, or Firm* — Fish & Richardson P.C.

(57) ABSTRACT

Technologies related to mobile credit payment are disclosed. In an implementation, a credit payment request is generated and sent to a user account of a credit payment application (APP) installed on a mobile computing device. A payment response message is then received from the mobile computing device. The payment response message is parsed to identify an APP public key license. A pre-stored credit authorization public key is used to verify the APP public key license and an APP public key is received from the APP public key license if the verification is successful. A payment deduction request is generated and sent to the user account of the credit payment APP. A payment authorization encrypted using asymmetric key encryption is received from the mobile computing device. The APP public key is used to decrypt the payment authorization, and a transaction log is recorded if the second response message is successfully decrypted.

20 Claims, 26 Drawing Sheets

(51) Int. Cl.
    *G06Q 20/40*     (2012.01)
    *G06Q 20/24*     (2012.01)
    *G06Q 20/38*     (2012.01)

(52) U.S. Cl.
    CPC ....... *G06Q 20/3278* (2013.01); *G06Q 20/351* (2013.01); *G06Q 20/3829* (2013.01); *G06Q 20/40* (2013.01); *G06Q 20/4037* (2013.01); *G06Q 2220/00* (2013.01)

(56) References Cited

U.S. PATENT DOCUMENTS

| | | | |
|---|---|---|---|
| 9,881,294 B2 * | 1/2018 | Bishop | G06Q 30/06 |
| 2008/0183565 A1 | 7/2008 | Dixon et al. | |
| 2009/0132813 A1 | 5/2009 | Schibuk | |
| 2010/0057579 A1 * | 3/2010 | Tan | G06Q 20/105 705/17 |
| 2011/0087598 A1 * | 4/2011 | Bozeman | G06Q 20/10 705/45 |
| 2012/0159163 A1 | 6/2012 | von Behren et al. | |
| 2012/0193434 A1 | 8/2012 | Grigg et al. | |
| 2012/0197787 A1 | 8/2012 | Grigg et al. | |
| 2013/0080276 A1 | 3/2013 | Granbery | |
| 2013/0346319 A1 | 12/2013 | Tan | |
| 2014/0180826 A1 | 6/2014 | Boal | |
| 2014/0277783 A1 | 9/2014 | Knuth et al. | |
| 2015/0006386 A1 | 1/2015 | Tebbe | |
| 2015/0019443 A1 | 1/2015 | Sheets et al. | |
| 2015/0073996 A1 | 3/2015 | Makhotin et al. | |
| 2015/0262170 A1 | 9/2015 | Bouda | |
| 2015/0278796 A1 | 10/2015 | Jiang et al. | |
| 2015/0363764 A1 | 12/2015 | Grigg et al. | |
| 2016/0071100 A1 | 3/2016 | Noe et al. | |
| 2016/0085955 A1 * | 3/2016 | Lerner | G06F 21/725 726/20 |
| 2016/0217467 A1 | 7/2016 | Smets et al. | |
| 2016/0267458 A1 * | 9/2016 | Metral | G06Q 20/3278 |
| 2016/0283933 A1 * | 9/2016 | Orlando | G06Q 20/38215 |
| 2016/0308858 A1 * | 10/2016 | Nordstrom | H04L 9/3228 |
| 2017/0109726 A1 * | 4/2017 | Chen | G06Q 20/32 |
| 2017/0147588 A1 * | 5/2017 | Mailer | G06F 16/125 |
| 2017/0161843 A1 * | 6/2017 | Rizzini | G06Q 40/12 |
| 2017/0186057 A1 * | 6/2017 | Metnick | G06Q 20/02 |
| 2017/0270732 A1 * | 9/2017 | Troesch | G07C 9/00896 |
| 2018/0349901 A1 | 12/2018 | Chen et al. | |
| 2020/0126061 A1 | 4/2020 | Chen | |

FOREIGN PATENT DOCUMENTS

| | | |
|---|---|---|
| CN | 101809633 | 8/2010 |
| CN | 102081821 | 6/2011 |
| CN | 202077102 | 12/2011 |
| CN | 102468960 | 5/2012 |
| CN | 102630083 | 8/2012 |
| CN | 102902553 | 1/2013 |
| CN | 103136668 | 6/2013 |
| CN | 103188238 | 7/2013 |
| CN | 103500400 | 1/2014 |
| CN | 103617532 | 3/2014 |
| CN | 103812835 | 5/2014 |
| CN | 104602224 | 5/2015 |
| CN | 105096113 | 11/2015 |
| EP | 2278539 | 1/2011 |
| JP | 2003044765 | 2/2003 |
| JP | 2004005410 | 1/2004 |
| JP | 2006108767 | 4/2006 |
| JP | 2010541036 | 12/2010 |
| JP | 2013546108 | 12/2013 |
| JP | 2014230004 | 12/2014 |
| KR | 20010025193 | 4/2001 |
| KR | 20010033972 | 4/2001 |
| KR | 20040084346 | 10/2004 |
| KR | 100845281 | 7/2008 |
| KR | 20150069237 | 6/2015 |
| TW | 200526056 | 8/2005 |
| TW | 201303780 | 1/2013 |
| TW | 201424441 | 6/2014 |
| TW | 201429173 | 7/2014 |
| TW | I460664 | 11/2014 |
| TW | 201523476 | 6/2015 |
| TW | 201539339 | 10/2015 |
| WO | WO 2014048990 | 4/2014 |
| WO | WO 2015148850 | 10/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in European Application No. 17743591.4, dated Aug. 14, 2019, 8 pages.
International Preliminary Report on Patentability in International Application No. PCT/CN2017/071254 dated Jul. 31, 2018; 10 pages.
Extended European Search Report in European Application No. 17743590.6, dated Sep. 16, 2019, 9 pages.
International Search Report issued by the International Searching Authority in International Application No. PCT/CN2017/071251 dated Apr. 21, 2017; 9 pages.
PCT International Preliminary Report on Patentability in International Application No. PCT/CN2017/071251, dated Jul. 31, 2018, 9 pages (with English translation).
PCT International Written Opinion of the International Searching Authority in International Application No. PCT/CN2017/071251, dated Apr. 21, 2017, 8 pages (with English translation).
U.S. Appl. No. 16/042,808, filed Jul. 23, 2018, Xing Chen.
U.S. Appl. No. 16/719,348, filed Dec. 18, 2019, Xing Chen.
U.S. Appl. No. 16/722,252, filed Dec. 20, 2019, Xing Chen.
Kuhn et al., "Introduction to Public Key Technology and the Federal PKI Infrastructure," National Institute of Standards and Technology, Feb. 2001, Document SP 800-32, pp. 1-54.

* cited by examiner

CREDIT PAYMENT METHOD AND APPARATUS BASED ON CARD EMULATION OF MOBILE TERMINAL

CROSS-REFERENCE TO RELATED APPLICATIONS

This application is a continuation of PCT Application No. PCT/CN2017/071254, filed on Jan. 16, 2017, which claims priority to Chinese Patent Application No. 201610051643.8, filed on Jan. 25, 2016, and each application is hereby incorporated by reference in its entirety.

TECHNICAL FIELD

The present disclosure relates to the field of communications technologies, and in particular, to a credit payment method and apparatus based on card emulation of a mobile terminal.

BACKGROUND

Currently, public transportation mainly includes buses and subways. When users purchase public transportation tickets, they normally use cash or pre-paid cards. Cash payment is mainly used for a bus system, and the user can buy a ticket by inserting coins. In addition, the user can buy a pre-paid metro card, and take a bus or the subway by scanning the card.

When a user purchases a bus ticket in cash, because many buses are self-service ticketing and provide no exchange, the user needs to prepare the exact amount of fares in advance, which can be inconvenient to the user. In addition, after close of business, bus system staff needs to count all the small fares that are put in by the self-service bus users, bringing extra work to the staff. When a user uses a metro card to take public transportation, because most current public transportation cards are usually non-contact radio frequency (RF) card, user-caused damages and wear, such as bending the card, or abrasion of the card's surface are easily made to the metro card during its normal use. When using a single-ride public transportation card, the user usually buys the single-ride public transportation card in small fares, and the staff also needs to count all the small fares.

When a user uses a reusable pre-paid card to take public transportation, because the prepaid card is not registered, its loss cannot be reported, and a great loss is caused to the user after the card is lost. The user also needs to purchase, recharge, and get a refund for the prepaid card at specified locations, which makes it inconvenient to the user.

SUMMARY

To overcome problems in the existing technologies, the present disclosure provides a credit payment method and device based on card emulation of a mobile terminal.

According to a first aspect of the implementations of the present disclosure, a credit payment method based on card emulation of a mobile terminal is provided, including: sending an application authorization request to a predetermined server; receiving an application public key certificate and an application private key sent by the predetermined server; storing the application public key certificate and the application private key in a credit payment application of the mobile terminal; sending a credit payment data acquisition request to the predetermined server; and receiving credit payment data sent by the predetermined server, and enabling a credit payment function of the mobile terminal based on the credit payment data.

The method further includes: obtaining device parameter information of the mobile terminal; sending the device parameter information to the predetermined server, so that the predetermined server determines, based on the received device parameter information, whether the mobile terminal meets a hardware condition for enabling credit payment; detecting whether credit payment enablement information sent by the predetermined server is received; and when the credit payment enablement information sent by the predetermined server is received, determining that the mobile terminal meets the hardware condition for enabling credit payment, and executing the step of sending an application authorization request to a predetermined server.

The method further includes: obtaining user identity information; sending the user identity information to the predetermined server, so that the predetermined server determines, based on the received user identity information, whether the mobile terminal meets a security certification condition for enabling credit payment; detecting whether security certification success information sent by the predetermined server is received; and when the security certification success information sent by the predetermined server is received, determining that the mobile terminal meets the security certification condition for enabling credit payment, and executing the step of sending an application authorization request to a predetermined server.

The method further includes: sending a request for obtaining a predetermined installation file to the predetermined server, where the predetermined installation file includes a credit payment installation file; obtaining the predetermined installation file sent by the predetermined server; and installing the predetermined installation file on the mobile terminal, and executing the step of sending an application authorization request to a predetermined server.

Further, the credit payment data includes a payment card number, a credit limit, an available credit, and a transaction authentication code (TAC) sub-key.

According to a second aspect of the implementations of the present disclosure, a credit payment method based on card emulation of a mobile terminal is provided, including: receiving an application authorization request sent by a mobile terminal; separately generating an application public key and an application private key based on the application authorization request; signing the application public key by using a credit authorization private key stored on a predetermined server, to generate an application public key certificate; sending the application public key certificate and the application private key to the mobile terminal; receiving a credit payment data acquisition request sent by the mobile terminal; and generating credit payment data corresponding to the mobile terminal based on the credit payment data acquisition request, and sending the credit payment data to the mobile terminal, so that the mobile terminal enables a credit payment function of the mobile terminal based on the received credit payment data.

The method further includes: receiving device parameter information sent by the mobile terminal; determining, based on the apparatus parameter information, whether the mobile terminal meets a hardware condition for enabling credit payment; and when the mobile terminal meets the hardware condition for enabling credit payment, sending credit payment enablement information to the mobile terminal, and executing the step of receiving an application authorization request sent by a mobile terminal.

The method further includes: receiving user identity information sent by the mobile terminal; determining, based on the user identity information, whether the mobile terminal meets a security certification condition for enabling credit payment; and when the mobile terminal meets the security certification condition for enabling credit payment, sending security certification success information to the mobile terminal, and executing the step of receiving an application authorization request sent by a mobile terminal.

The method further includes: receiving a request for obtaining a predetermined installation file sent by the mobile terminal, where the predetermined installation file includes a credit payment installation file; and sending the predetermined installation file to the mobile terminal based on the request for obtaining a predetermined installation file, and executing the step of receiving an application authorization request sent by a mobile terminal.

According to a third aspect of the implementations of the present disclosure, a credit payment device based on card emulation of a mobile terminal is provided, including: an application authorization request sending unit, configured to send an application authorization request to a predetermined server by using a credit authorization system application on a mobile terminal; a key receiving unit, configured to receive an application public key certificate and an application private key sent by the predetermined server; a key storage unit, configured to store the application public key certificate and the application private key in a credit payment application of the mobile terminal; a credit payment data acquisition request sending unit, configured to send a credit payment data acquisition request to the predetermined server; a credit payment data receiving unit, configured to receive credit payment data sent by the predetermined server; and a credit payment completion unit, configured to enable a credit payment function of the mobile terminal based on the credit payment data.

The device further includes: a device parameter information acquisition unit, configured to obtain device parameter information of the mobile terminal; a device parameter information sending unit, configured to send the device parameter information to the predetermined server, so that the predetermined server determines, based on the received device parameter information, whether the mobile terminal meets a hardware condition for enabling credit payment; a first detection unit, configured to detect whether credit payment enablement information sent by the predetermined server is received; and a hardware condition determining unit, configured to: when the credit payment enablement information sent by the predetermined server is received, determine that the mobile terminal meets the hardware condition for enabling credit payment.

The device further includes: a user identity information acquisition unit, configured to obtain user identity information; a user identity information sending unit, configured to send the user identity information to the predetermined server, so that the predetermined server determines, based on the received user identity information, whether the mobile terminal meets a security certification condition for enabling credit payment; a second detection unit, configured to detect whether security certification success information sent by the predetermined server is received; and a security certification condition determining unit, configured to: when the security certification success information sent by the predetermined server is received, determine that the mobile terminal meets the security certification condition for enabling credit payment.

The device further includes: a predetermined installation file acquisition request sending unit, configured to send a request for obtaining a predetermined installation file to the predetermined server, where the predetermined installation file includes a credit payment installation file; a predetermined installation file acquisition unit, configured to obtain the predetermined installation file sent by the predetermined server; and an installation unit, configured to install the predetermined installation file on the mobile terminal.

Further, the credit payment data includes a payment card number, a credit limit, an available credit, and a TAC sub-key.

According to a fourth aspect of the implementations of the present disclosure, a credit payment device based on card emulation of a mobile terminal is provided, including: an application authorization request receiving unit, configured to receive an application authorization request sent by a mobile terminal; a key generation unit, configured to separately generate an application public key and an application private key based on the application authorization request; an application public key certificate generation unit, configured to sign the application public key by using a credit authorization private key stored on a predetermined server, to generate an application public key certificate; a data sending unit, configured to send the application public key certificate and the application private key to the mobile terminal; a credit payment data acquisition request receiving unit, configured to receive a credit payment data acquisition request sent by the mobile terminal; a credit payment data generation unit, configured to generate credit payment data corresponding to the mobile terminal based on the credit payment data acquisition request; and a credit payment data sending unit, configured to send the credit payment data to the mobile terminal, so that the mobile terminal enables a credit payment function of the mobile terminal based on the received credit payment data.

The device further includes: a device parameter information receiving unit, configured to receive device parameter information sent by the mobile terminal; a first determining unit, configured to determine, based on the device parameter information, whether the mobile terminal meets a hardware condition for enabling credit payment; and a credit payment enablement information sending unit, configured to: when the mobile terminal meets the hardware condition for enabling credit payment, send credit payment enablement information to the mobile terminal.

The device further includes: a user identity information receiving unit, configured to receive user identity information sent by the mobile terminal; a second determining unit, configured to determine, based on the user identity information, whether the mobile terminal meets a security certification condition for enabling credit payment; and a security certification success information sending unit, configured to: when the mobile terminal meets the security certification condition for enabling credit payment, send security certification success information to the mobile terminal.

The device further includes: a predetermined installation file acquisition request receiving unit, configured to receive a request for obtaining a predetermined installation file sent by the mobile terminal, where the predetermined installation file includes a credit payment installation file; and a predetermined installation file sending unit, configured to send the predetermined installation file to the mobile terminal based on the request for obtaining a predetermined installation file.

The technical solutions provided in the implementations of the present disclosure can include the following beneficial effects:

The credit payment method and device based on card emulation of a mobile terminal provided in the present disclosure can be applied to a mobile terminal and a transaction terminal. After enabling a payment application, a user can complete offline credit payment on the transaction terminal by using the mobile terminal, to quickly and securely complete a payment transaction. Online payment is not needed. As such, unlike the existing technologies, the user can complete the payment transaction without using cash or a public transportation card when taking public transportation.

It should be understood that the previous general descriptions and the following detailed descriptions are merely an example and explanation, and cannot limit the present disclosure.

BRIEF DESCRIPTION OF DRAWINGS

The accompanying drawings here are incorporated in the specification, become a part of the specification, show implementations in accordance with the present disclosure, and are used with the specification to explain a principle of the present disclosure.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent the same or similar elements. Implementation methods described in the following example implementations do not represent all implementation methods consistent with the present disclosure. Instead, they are only examples of devices and methods described in the appended claims in detail and consistent with some aspects of the present disclosure.

Mobile payment is also referred to as payment with a mobile phone, and a user can pay for a purchased product or service by using a mobile terminal. The mobile terminal can communicate with a transaction terminal through near field communication (NFC), to implement a payment transaction. The NFC is also referred to as proximity-based communication: a short-distance, high-frequency radio communication technology that allows non-contact point-to-point data transmission and data exchange between electronic devices. The secure nature of NFC technology shows good application prospect in fields, such as payment.

Card emulation is one of three working modes of the NFC technology. The card emulation is an integrated circuit (IC) card using a radio frequency identification (RFID) technology, and can replace a large number of IC cards (including credit cards) in most scenarios, for example, card scanning in malls, public transportation cards, access control, tickets, etc. A great advantage of the present method is that the card is powered by an RF domain of a non-contact card reader, and therefore the card can work even if a host device (such as a mobile phone) is powered off.

To facilitate better understanding and implementation of the present disclosure by a person skilled in the art, a correlation among a mobile terminal, a payment terminal, and a server in the implementations of the present disclosure is first briefly described, for example, how to transmit and process data between the previous terminals. The present disclosure can be applied to many fields such as mobile payment. For better description, the present disclosure is illustrated by a scenario, where customers use mobile phone credit payment to purchase public transportation fares.

Figure 1:
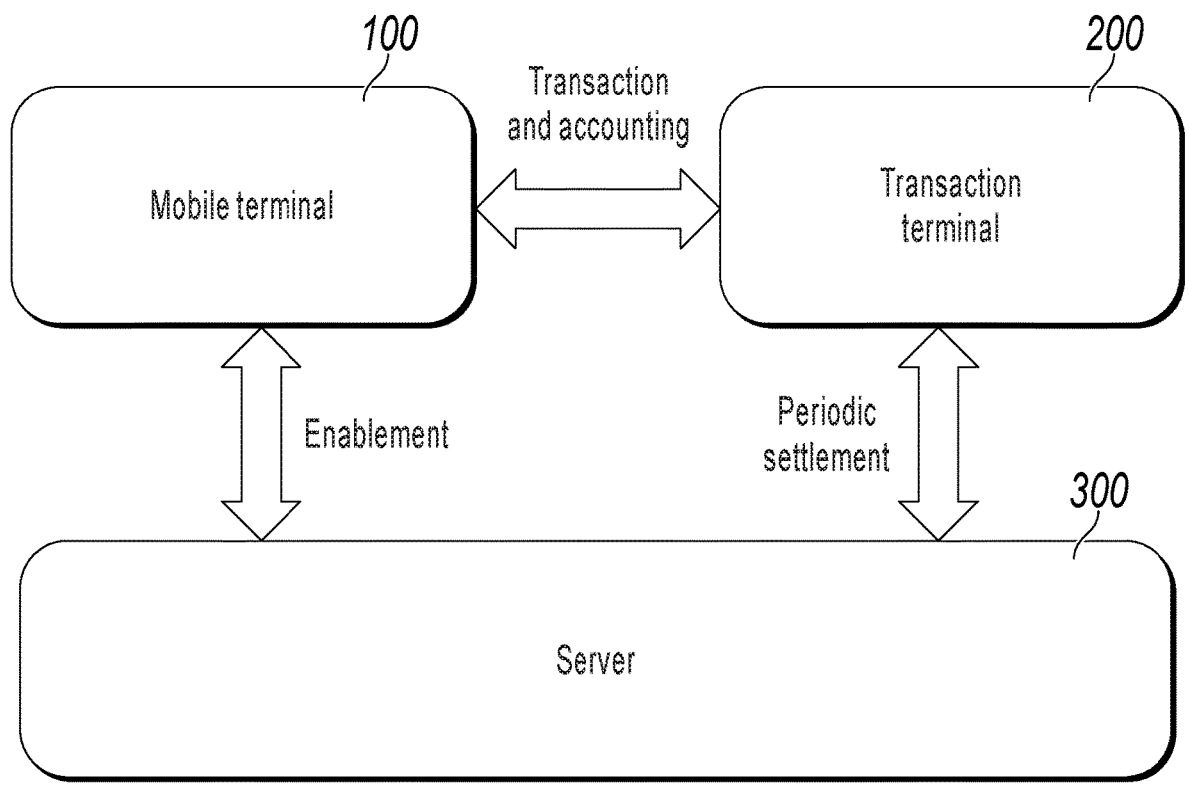
FIG. 1 is a schematic diagram illustrating a credit authorization system, according to an implementation of the present disclosure.

As shown in FIG. 1, a credit authorization system application, according to the implementations of the present disclosure, includes a mobile terminal 100, a transaction terminal 200, and a server 300. The mobile terminal 100 can be a mobile phone with a payment transaction function. The transaction terminal 200 can be a bus gate, and the bus gate is a POS terminal used in a bus and subway system. The server 300 is a server in a credit authorization system application. Before making a payment transaction with the transaction terminal 200 by using the mobile terminal 100, a user needs to first enable a credit payment transaction function of the mobile terminal 100 by using the server 300. In addition, the transaction terminal 200 periodically uploads a transaction log of the mobile terminal 100 to the server 300, and the server 300 deducts a corresponding amount of money from an account corresponding to the mobile terminal 100, and pays the money to a bus company.

In the implementations of the present disclosure, two applications can be installed on the mobile terminal. One application is a credit payment application such as Applet. Sun Corporation sets the application Applet as the object running on a Java card. The other application on the mobile terminal can be a credit authorization system application. Functions of the two applications can be implemented by using one application.

The transaction terminal 200 uses a strict identity security certification mechanism to ensure that only a user passing identity security certification and having enough credit limit can enable a bus credit payment application.

The credit payment application Applet is installed on the mobile terminal 100 having an NFC function, generates an application public and private key pair during personalization, and stores an application private key in the credit payment application. The credit payment application ensures that data cannot be stolen under any condition. An application public key is signed as an application public key certificate by using a private key of the credit authorization system application, and is stored in the credit payment application. A public key of the credit authorization system application is provided for the transaction terminal 200, and a storage location is determined by the transaction terminal 200. Since it is a public key, no mandatory security requirement needs to be imposed on the public key.

When a credit payment transaction is provided, after reading the application public key certificate in the credit payment application, the transaction terminal 200 verifies the application public key certificate by using the public key of the credit authorization system application, and restores the application public key. The credit payment application generates a payment authorization license by using the application private key. The transaction terminal 200 verifies the payment authorization license by using the application public key, and checks a security factor in the authorization license after the verification succeeds. After confirming security, the transaction terminal 200 performs credit accounting, and then settles a corresponding credit account at a specified time. To ensure payment security, when a quantity of use times, a use credit, and a time interval exceeds a specified threshold, the mobile terminal needs to be connected to a network to verify user identity information, and grant authorization again.

Figure 2:
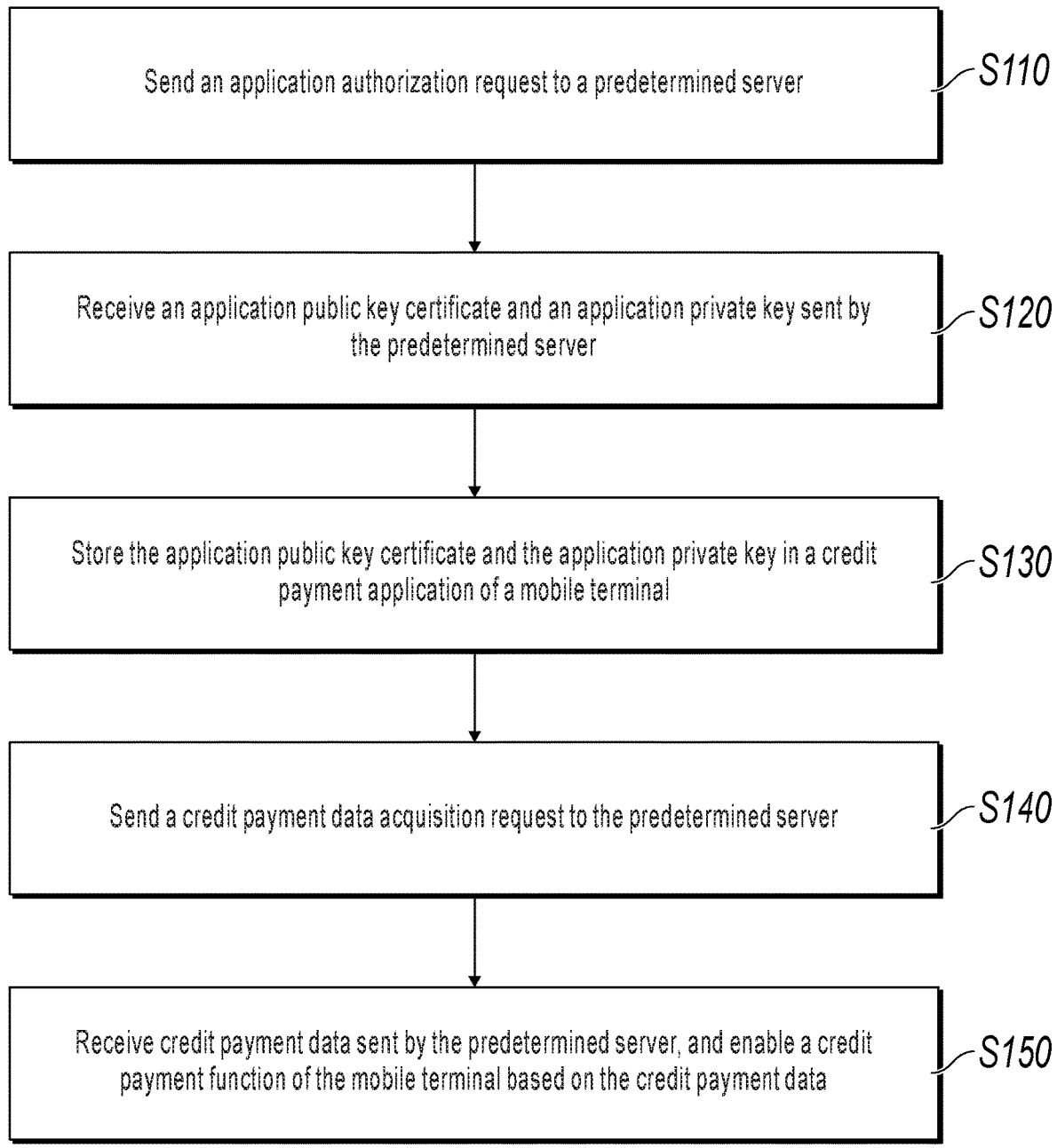
FIG. 2 is a flowchart illustrating a credit payment method based on card emulation of a mobile terminal, according to an example implementation.

To resolve a related technical problem, an implementation of the present disclosure first provides a credit payment method based on card emulation of a mobile terminal, applied to a process of enabling credit payment by a mobile terminal. As shown in FIG. 2, the method can include the following steps.

Step S110: Send an application authorization request to a predetermined server.

A credit authorization system application is installed on the mobile terminal, and the mobile terminal can send the application authorization request to a server of a credit authorization system by using the authorization system application.

Step S120: Receive an application public key certificate and an application private key sent by the predetermined server.

The server of the credit authorization system generates a pair of application public and private keys, that is, an application public key and an application private key based on the received application authorization request. The server signs the application public key by using a locally-stored authorized private key to generate the application public key certificate, and separately sends the obtained application public key certificate and application private key to the mobile terminal.

Step S130: Store the application public key certificate and the application private key in a credit payment application of the mobile terminal.

The mobile terminal stores the application public key certificate and the application private key sent by the server in the credit payment application of the mobile terminal.

Step S140: Send a credit payment data acquisition request to the predetermined server.

Step S150: Receive credit payment data sent by the predetermined server, and enable a credit payment function of the mobile terminal based on the credit payment data.

Credit payment data can be a personalized script. The personalized script can include a payment card number, a credit limit, an available credit, and a TAC sub-key. The payment card number is a unique character code generated by the credit authorization system for a credit payment application of each user. The available credit is an amount of money that a user can currently spend. The TAC sub-key is obtained by the server of the credit authorization system through hashing based on the card number and by using a TAC parent private key.

Figure 3:
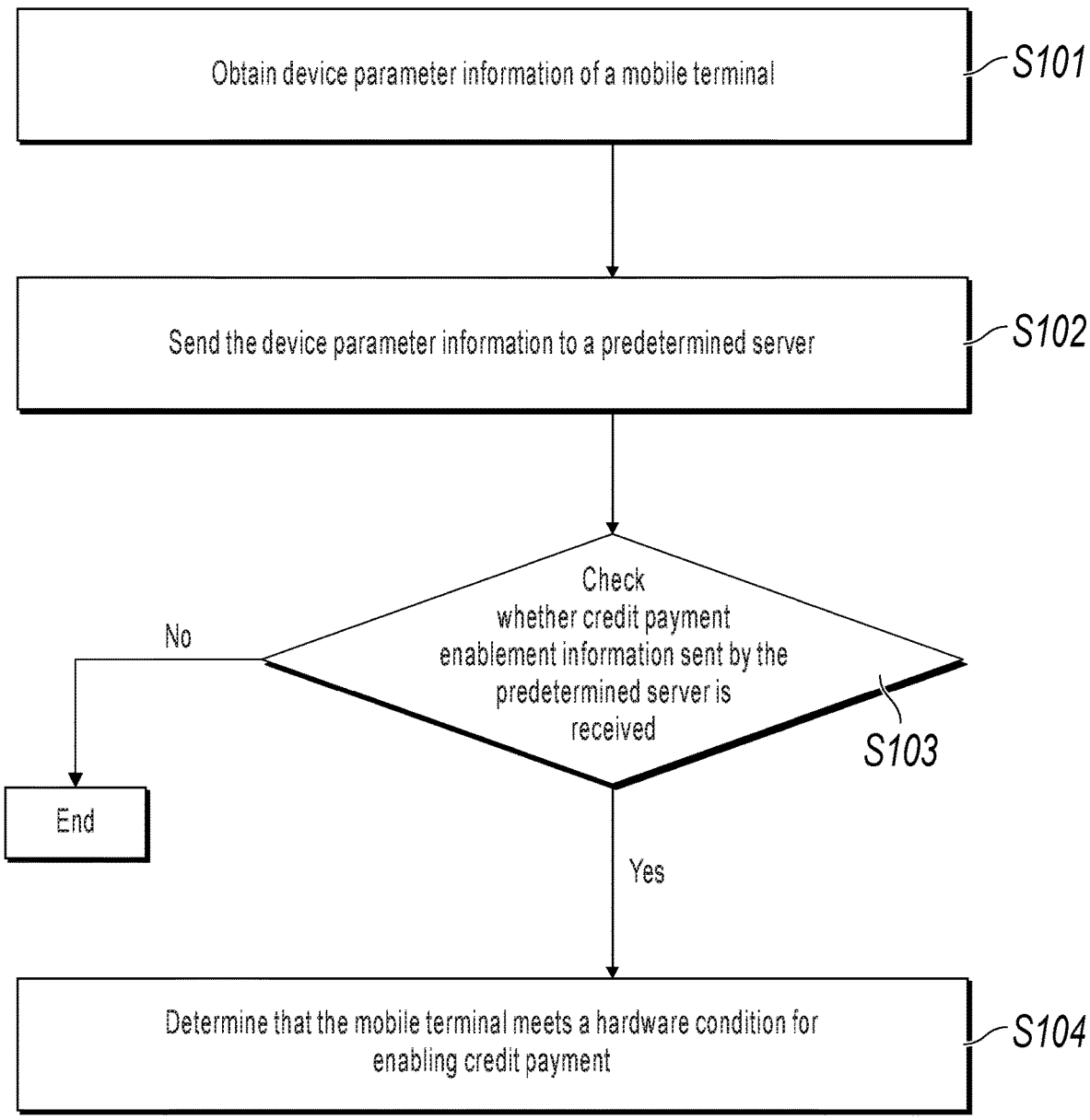
FIG. 3 is a flowchart illustrating a credit payment method based on card emulation of a mobile terminal, according to another example implementation.

In another implementation of the present disclosure, based on FIG. 2, as shown in FIG. 3, the method can further include the following steps before step S110.

Step S101: Obtain device parameter information of the mobile terminal.

The device parameter information of the mobile terminal can be hardware information of the mobile terminal. Whether the mobile terminal has a hardware condition for a payment transaction, for example, whether the mobile terminal has an NFC function, needs to be checked based on the device parameter information. Certainly, the device parameter information can be information such as a device model, a ROM version, a system model (such as an android version), and an application version of the mobile terminal.

Step S102: Send the device parameter information to the predetermined server.

The mobile terminal sends the obtained device parameter information to the server of the credit authorization system, so that the server determines, based on the received device parameter information, whether the mobile terminal meets a hardware condition for enabling credit payment.

Step S103: Check whether credit payment enablement information sent by the predetermined server is received.

If the mobile terminal meets the hardware condition for enabling credit payment, the server sends the credit payment enablement information to the mobile terminal. The credit payment enablement information can be a credit payment application enablement page.

If the mobile terminal does not meet the hardware condition for enabling credit payment, the server will not send the credit payment enablement information to the mobile terminal.

When the credit payment enablement information sent by the predetermined server is received, step S104 is performed.

Step S104: Determine that the mobile terminal meets a hardware condition for enabling credit payment, and then perform step S110.

Figure 4:
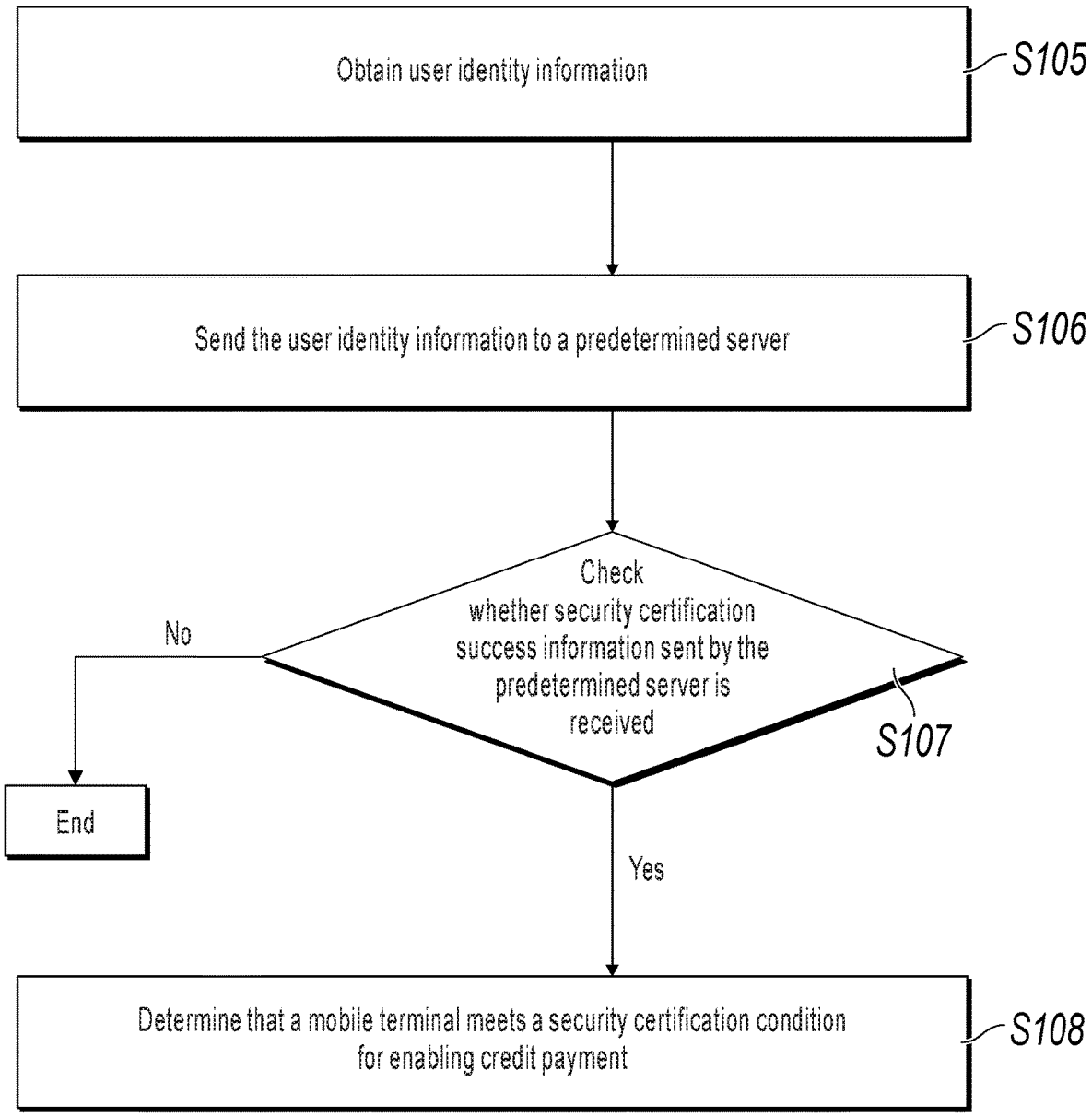
FIG. 4 is a flowchart illustrating a credit payment method based on card emulation of a mobile terminal, according to yet another example implementation.

In addition to checking whether the mobile terminal meets the hardware condition for enabling credit payment, based on FIG. 2, before step S110, as shown in FIG. 4, whether the mobile terminal meets a security certification condition further needs to be checked. Therefore, in another implementation of the present disclosure, the credit payment method based on card emulation of a mobile terminal according to the present disclosure can further include the following steps.

Step S105: Obtain user identity information.

The user identity information can be information such as an identity card number, a name, a bank card number, an email address, or an Alipay account of a user.

Step S106: Send the user identity information to the predetermined server, so that the predetermined server determines, based on the received user identity information, whether the mobile terminal meets a security certification condition for enabling credit payment.

The mobile terminal sends the user identity information to the server of the credit authorization system, so that the server verifies the user identity information, for example, verifies whether the bank card number provides service normally, and whether the user account has a poor credit transaction record.

Step S107: Check whether security certification success information sent by the predetermined server is received.

After receiving user information sent by the mobile terminal, the server checks the user information. If the security certification condition for enabling credit payment is met, the server sends the security certification success information to the mobile terminal.

When the security certification success information sent by the predetermined server is received, step S108 is performed. In step S108, determine that the mobile terminal meets the security certification condition for enabling credit payment, and then step S110 is performed.

When the mobile terminal receives the security certification success information sent by the server, it is determined that the mobile terminal meets the security certification condition for enabling credit payment.

When the mobile terminal does not receive the security certification success information sent by the server, it is determined that the mobile terminal does not meet the security certification condition for enabling credit payment.

Figure 5:
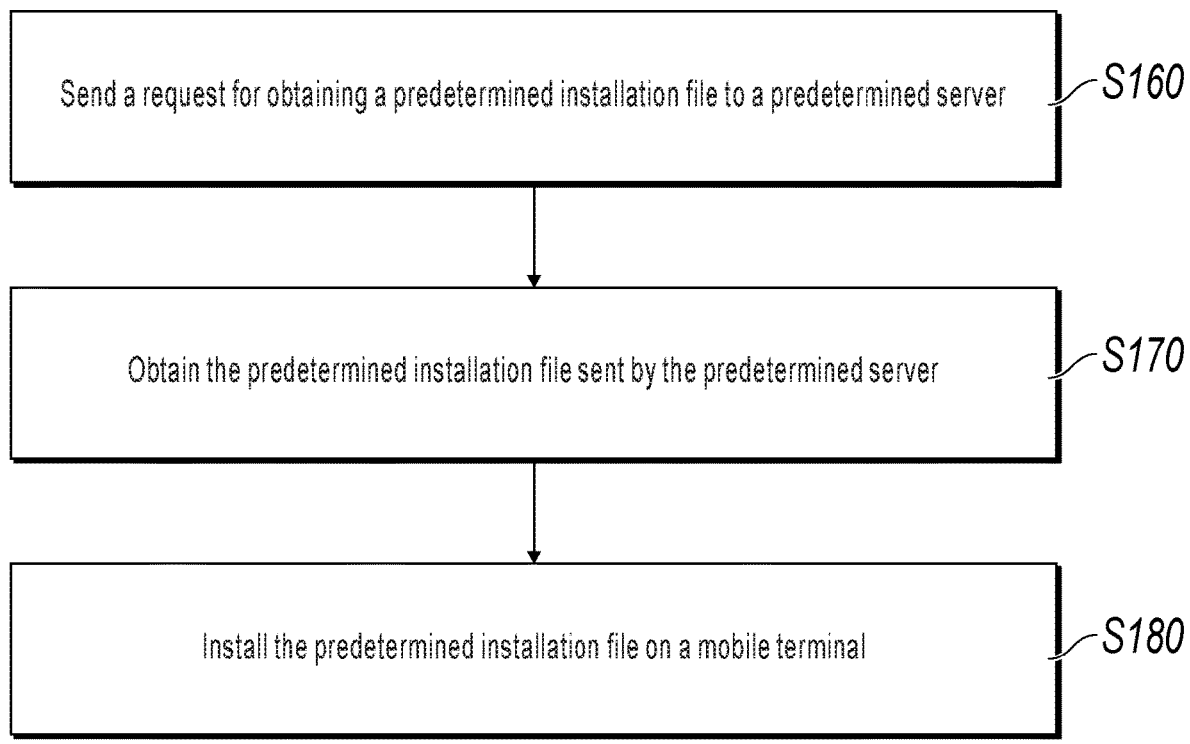
FIG. 5 is a flowchart illustrating a credit payment method based on card emulation of a mobile terminal, according to yet another example implementation.

Based on FIG. 2, before step S110, as shown in FIG. 5, a related application further needs to be installed on the mobile terminal. Therefore, the credit payment method based on card emulation of a mobile terminal according to the present disclosure further includes the following steps.

Step S160: Send a request for obtaining a predetermined installation file to the predetermined server.

The predetermined installation file includes a credit payment installation file.

Step S170: Obtain the predetermined installation file sent by the predetermined server.

Step S180: Install the predetermined installation file on the mobile terminal. Then, step S110 is performed.

After a credit payment application and a registration script are separately installed on the mobile terminal, user personalization of the mobile terminal is competed. Then, a procedure of enabling the credit payment function on the mobile terminal is completed. Based on the previous implementations, an execution procedure on the server of the credit authorization system in which the mobile terminal enables the credit payment function is described below in detail.

Figure 6:
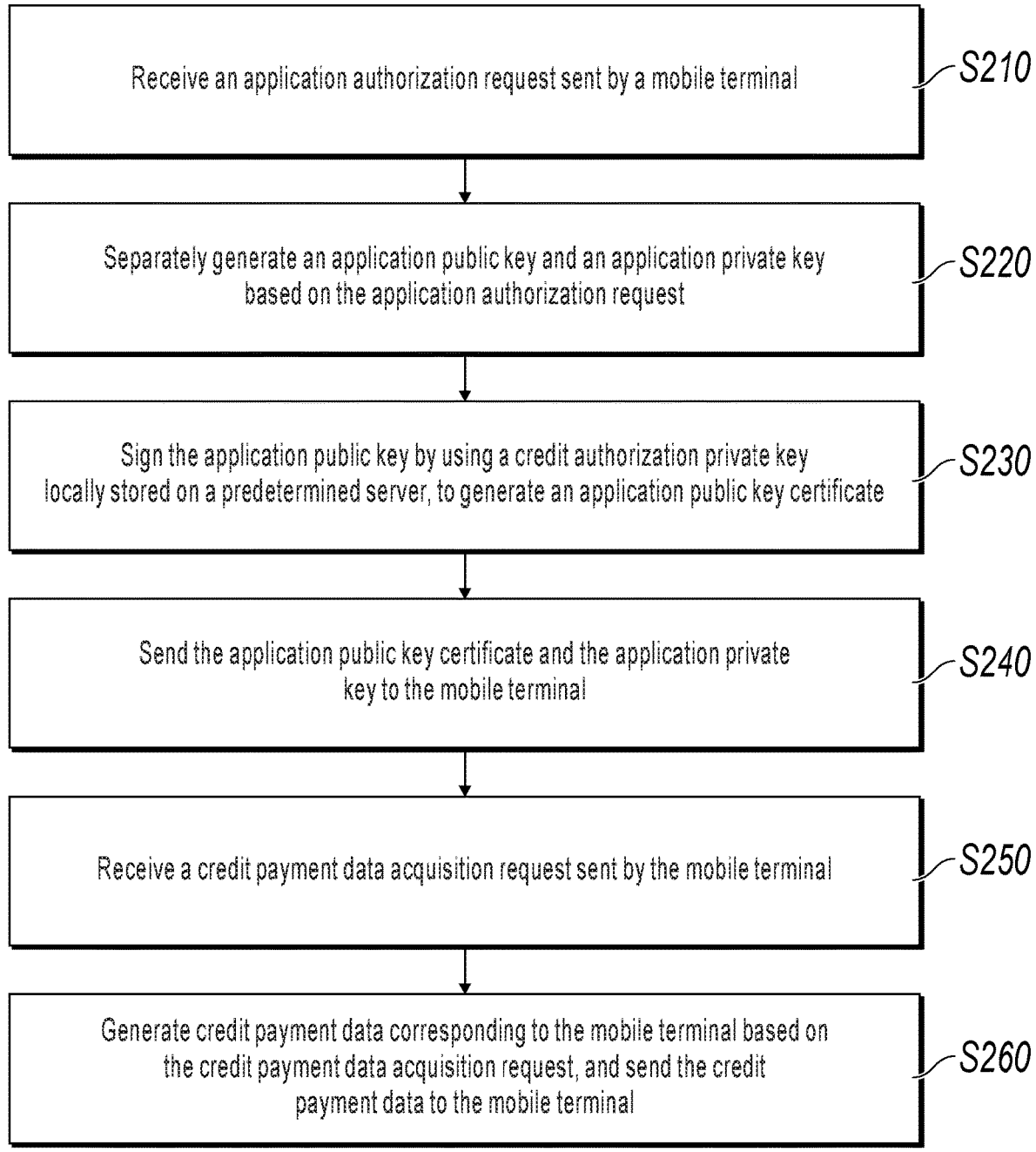
FIG. 6 is a flowchart illustrating a credit payment method based on card emulation of a mobile terminal, according to yet another example implementation.

In another implementation of the present disclosure, as shown in FIG. 6, an execution procedure of the credit payment method based on card emulation of a mobile terminal on a server (a server of a credit authorization system) according to the present disclosure can include the following steps.

Step S210: Receive an application authorization request sent by a mobile terminal.

Step S220: Separately generate an application public key and an application private key based on the application authorization request.

Step S230: Sign the application public key by using a credit authorization private key locally stored on a predetermined server, to generate an application public key certificate.

Step S240: Send the application public key certificate and the application private key to the mobile terminal.

The server of the credit authorization system generates a pair of application public and private keys, that is, an application public key and an application private key based on the received application authorization request. The server signs the application public key by using a locally-stored authorized private key to generate the application public key certificate, and separately sends the obtained application public key certificate and application private key to the mobile terminal.

Step S250: Receive a credit payment data acquisition request sent by the mobile terminal.

Step S260: Generate credit payment data corresponding to the mobile terminal based on the credit payment data acquisition request, and send the credit payment data to the mobile terminal, so that the mobile terminal enables a credit payment function of the mobile terminal based on the received credit payment data.

Credit payment data can be a personalized script. The personalized script includes a payment card number, a credit limit, an available credit, and a TAC sub-key. The payment card number is a unique character code generated by the credit authorization system for a credit payment application of each user. The available credit is an amount of money that the user can currently use. The TAC sub-key is obtained by the server of the credit authorization system through hashing based on the card number hash by using a TAC parent private key.

Figure 7:
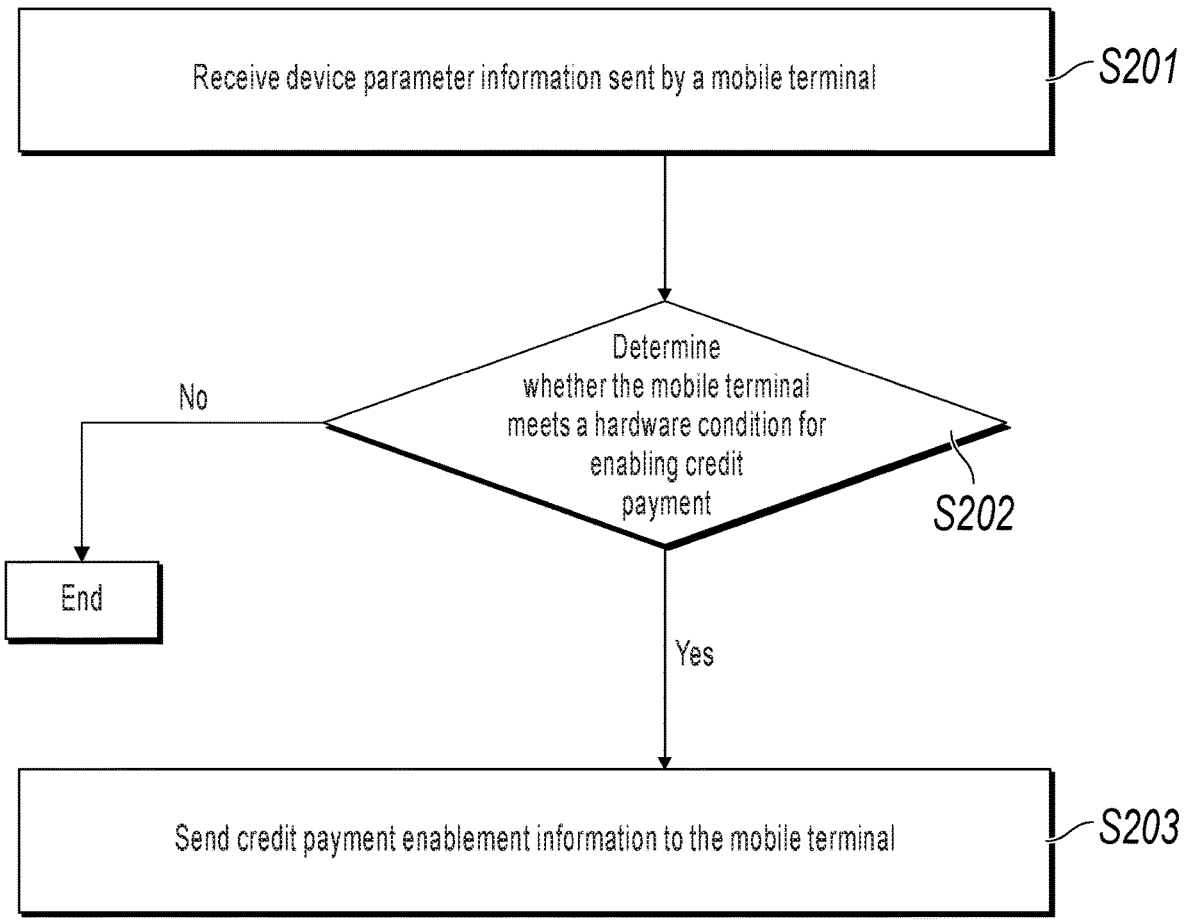
FIG. 7 is a flowchart illustrating a credit payment method based on card emulation of a mobile terminal, according to yet another example implementation.

Based on FIG. 6, as shown in FIG. 7, in another implementation of the present disclosure, the server (the server of the credit authorization system) determines, based on device parameter information sent by the mobile terminal, whether the mobile terminal meets a hardware condition for enabling credit payment. Therefore, the credit payment method based on card emulation of a mobile terminal according to the present implementation of the present disclosure can further include the following steps before step S210.

Step S201: Receive device parameter information sent by the mobile terminal.

In a process of enabling a credit payment function by the mobile terminal, the mobile terminal can communicate with the server of the credit authorization system (that is, the server) through a network, and the server of the credit authorization system can receive the device parameter information sent by the mobile terminal.

Step S202: Determine, based on the device parameter information, whether the mobile terminal meets a hardware condition for enabling credit payment.

The parameter information sent by the mobile terminal can be information such as a device model, a ROM version, a system model (such as an android version), and an application version of the mobile terminal. The server can check, based on the previous information sent by the mobile terminal, whether the mobile terminal has an NFC function.

If the server checks that the mobile terminal meets the hardware condition for enabling credit payment, the server sends credit payment enablement information to the mobile terminal. The credit payment enablement information can be a credit payment application enablement page. A user can enter user information on the credit payment application enablement interface on the mobile terminal, and upload the user information to the server.

If the server checks that the mobile terminal does not meet the hardware condition for enabling credit payment, the server will not send credit payment enablement information to the mobile terminal.

When the mobile terminal meets the hardware condition for enabling credit payment, in step S203, credit payment enablement information is sent to the mobile terminal. Then, step S210 is performed.

Figure 8:
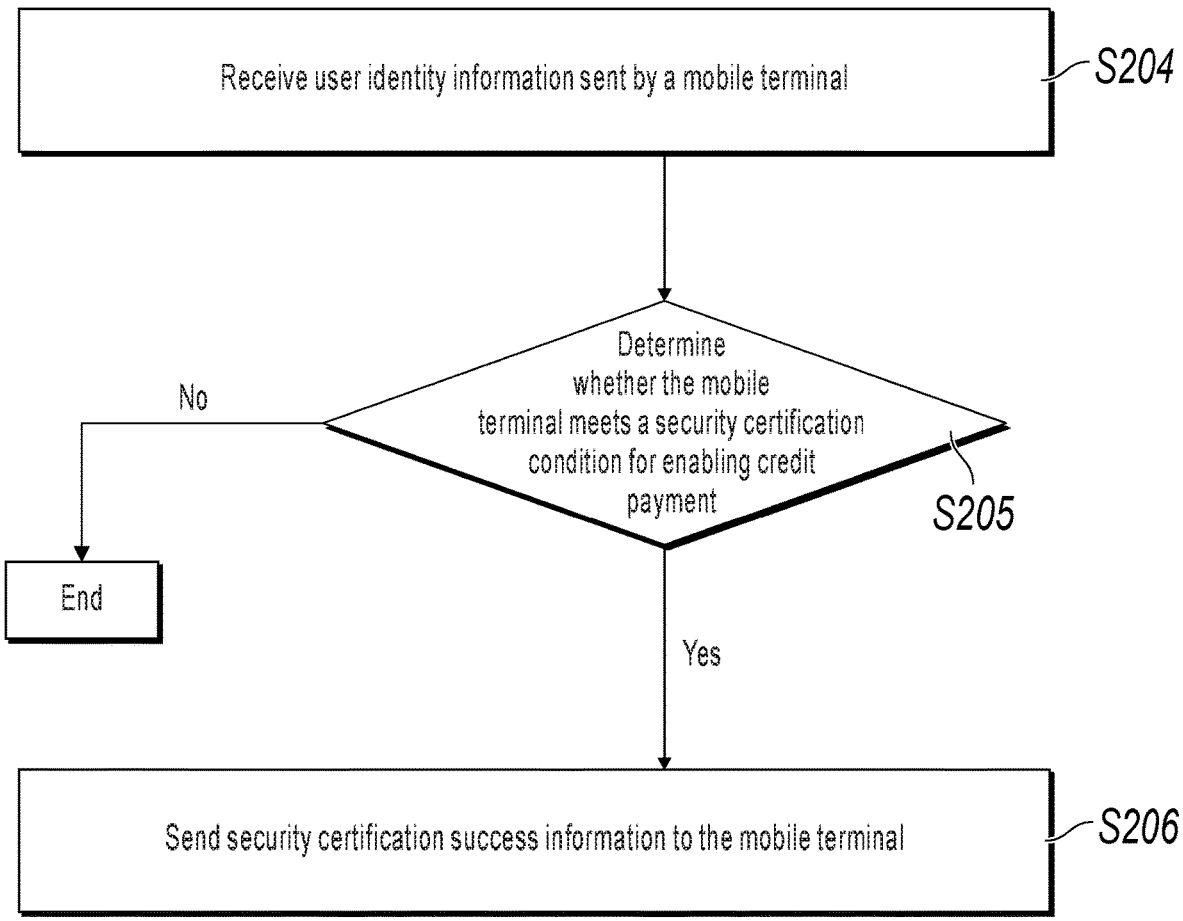
FIG. 8 is a flowchart illustrating a credit payment method based on card emulation of a mobile terminal, according to yet another example implementation.

In addition to the device parameter information sent by the mobile terminal, the server of the credit authorization system needs to check user identity information sent by the mobile terminal, and determines whether a user corresponding to the mobile terminal meets a security certification condition. Therefore, based on FIG. 6, as shown in FIG. 8, in a process of enabling the credit payment function by the mobile terminal, the credit payment method based on card emulation of a mobile terminal according to the present disclosure can further include the following steps before step S210.

Step S204: Receive user identity information sent by the mobile terminal.

The user identity information can be information such as an identity card number, a name, a bank card number, an email address, or an ALIPAY account of a user.

Step S205: Determine, based on the user identity information, whether the mobile terminal meets a security certification condition for enabling credit payment.

For example, the server can check whether a bank card number in the user identity information provides a service normally, and whether there is a poor transaction record.

If checking that the mobile terminal meets the security certification condition for enabling credit payment, the server sends security certification success information to the mobile terminal.

When the mobile terminal meets the security certification condition for enabling credit payment, in step S206, security certification success information is sent to the mobile terminal. Then, step S210 is performed.

Figure 9:
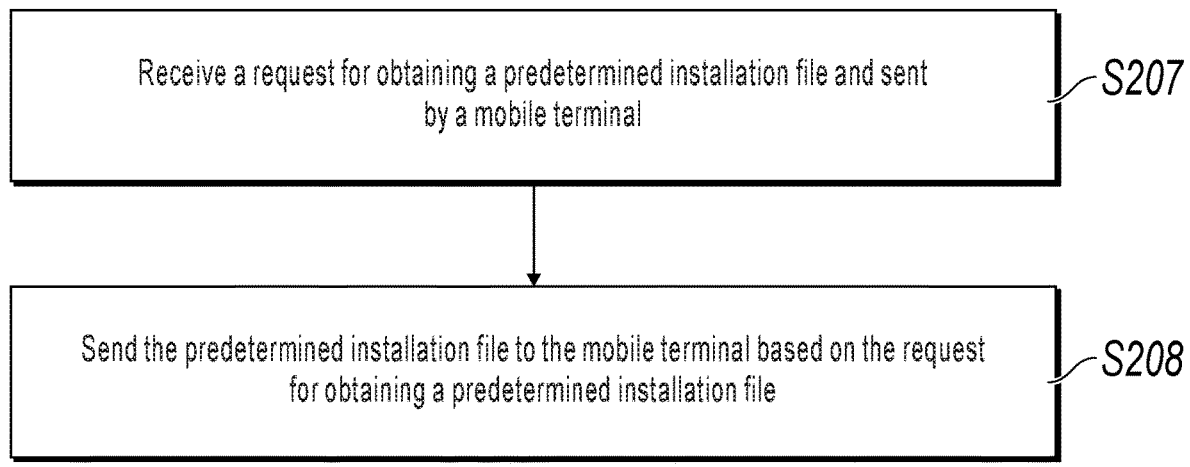
FIG. 9 is a flowchart illustrating a credit payment method based on card emulation of a mobile terminal, according to yet another example implementation.

When enabling credit payment, the mobile terminal further needs to install a credit payment application, and these installation files need to be sent by the server of the credit payment system to the mobile terminal. Therefore, based on FIG. 6, as shown in FIG. 9, in another implementation of the present disclosure, the credit payment method based on card emulation of a mobile terminal according to the present disclosure can further include the following steps before step S210.

Step S207: Receive a request for obtaining a predetermined installation file sent by the mobile terminal.

The predetermined installation file includes a credit payment installation file.

Step S208: Send the predetermined installation file to the mobile terminal based on the request for obtaining a predetermined installation file, and then perform step S210.

Data exchange between a mobile terminal and a transaction terminal during a payment transaction is first described below.

Figure 10:
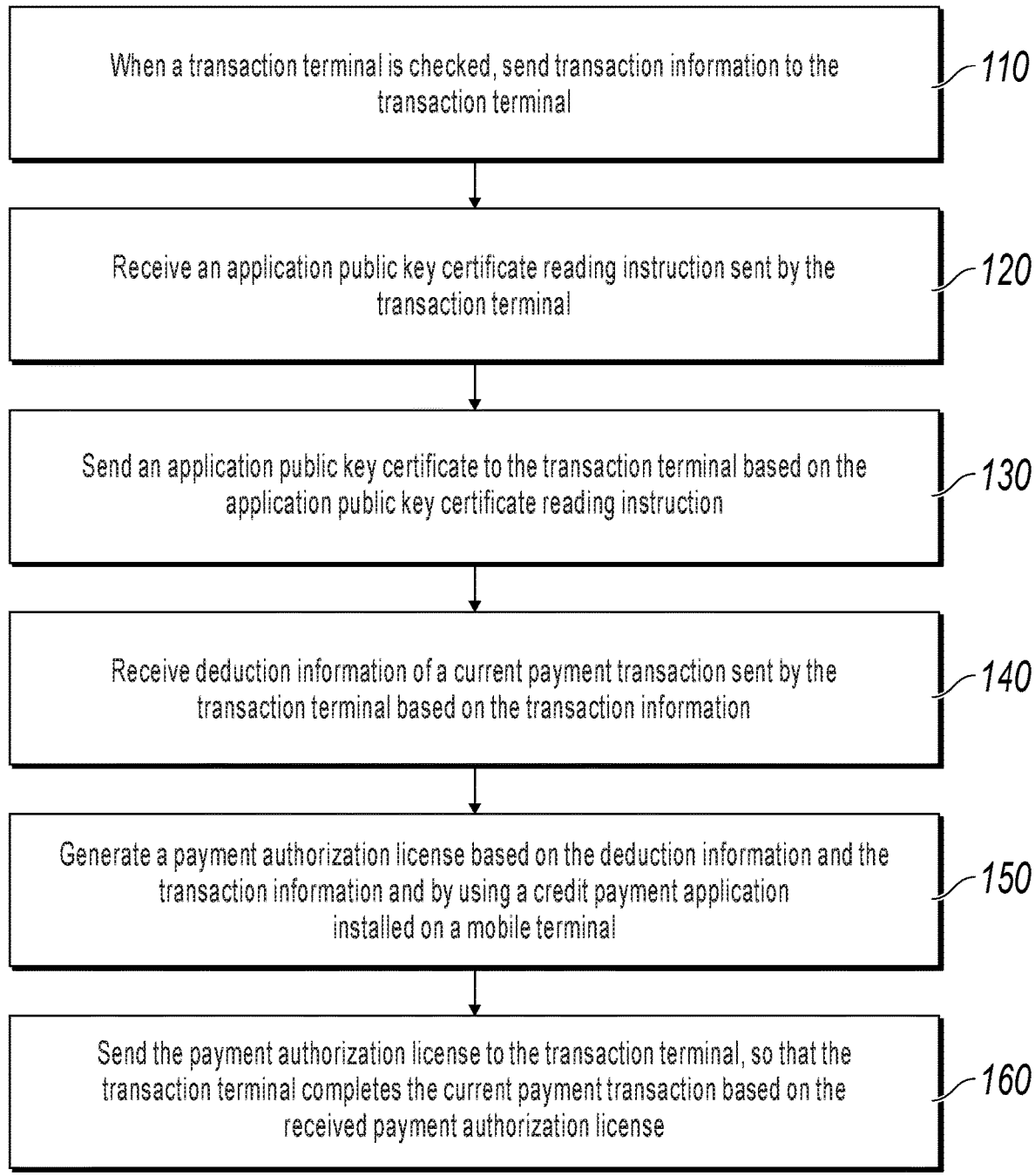
FIG. 10 is a flowchart illustrating a credit payment method based on card emulation of a mobile terminal, according to yet another example implementation.

To resolve a related technical problem, an implementation of the present disclosure provides a credit payment method based on card emulation of a mobile terminal, applied to a mobile terminal. As shown in FIG. 10, the method can include the following steps.

Step 110: When a transaction terminal is checked, send transaction information to the transaction terminal.

For ease of description, an example that the transaction terminal is a bus gate is used for this description.

When a user holding a mobile terminal approaches a bus gate to make a payment transaction, because a radio frequency field can be generated on the bus gate, the mobile terminal can detect the radio frequency field generated on the bus gate when the mobile terminal approaches the bus gate, and then can detect the bus gate. When the mobile terminal detects the bus gate, the mobile terminal sends the transaction information to the bus gate.

Step 120: Receive an application public key certificate reading instruction sent by the transaction terminal.

After the bus gate receives the transaction information sent by the mobile terminal, the bus gate sends the application public key certificate reading instruction to the mobile terminal after processing and confirming the transaction information. After the mobile terminal receives the application public key certificate reading instruction sent by the bus gate, a credit payment application on the mobile terminal reads an application public key certificate generated in advance and stored on the mobile terminal.

Step 130: Send an application public key certificate to the transaction terminal based on the application public key certificate reading instruction.

The credit payment application on the mobile terminal sends the read application public key certificate to the bus gate based on the application public key certificate reading instruction.

Step 140: Receive deduction information of a current payment transaction sent by the transaction terminal based on the transaction information.

After receiving the application public key certificate sent by the mobile terminal, the bus gate verifies the application public key certificate, generates the deduction information of the current payment transaction, and sends the deduction information to the mobile terminal. The mobile terminal receives the deduction information sent by the bus gate.

Step 150: Generate a payment authorization license based on the deduction information and the transaction information and by using a credit payment application installed on the mobile terminal.

The payment authorization license generated by the mobile terminal includes signature data and a TAC.

Step 160: Send the payment authorization license to the transaction terminal, so that the transaction terminal completes the current payment transaction based on the received payment authorization license.

After receiving the payment authorization license sent by the mobile terminal, the bus gate verifies the payment license. If the verification succeeds, it is determined that the current payment transaction is completed.

According to the credit payment method based on card emulation of a mobile terminal in the present implementation of the present disclosure, when the user makes a payment transaction with the transaction terminal by using the mobile terminal, the mobile terminal separately sends the transaction information, the application public key certificate, and the generated payment authorization license to the transaction terminal based on related instruction information sent by the transaction terminal. The transaction terminal completes the current payment transaction based on the information sent by the mobile terminal. Unlike the existing technologies, in the credit payment method based on card emulation of a mobile terminal in the present implementation of the present disclosure, when making a transaction with the transaction terminal by using the mobile terminal, the user can make both the mobile terminal and the transaction terminal offline, and credit consumption is used for a user account of the mobile terminal. The account is settled only after the user makes purchase by using the mobile terminal, so that the user can be protected from a capital loss risk caused by using cash in a transaction.

Figure 11:
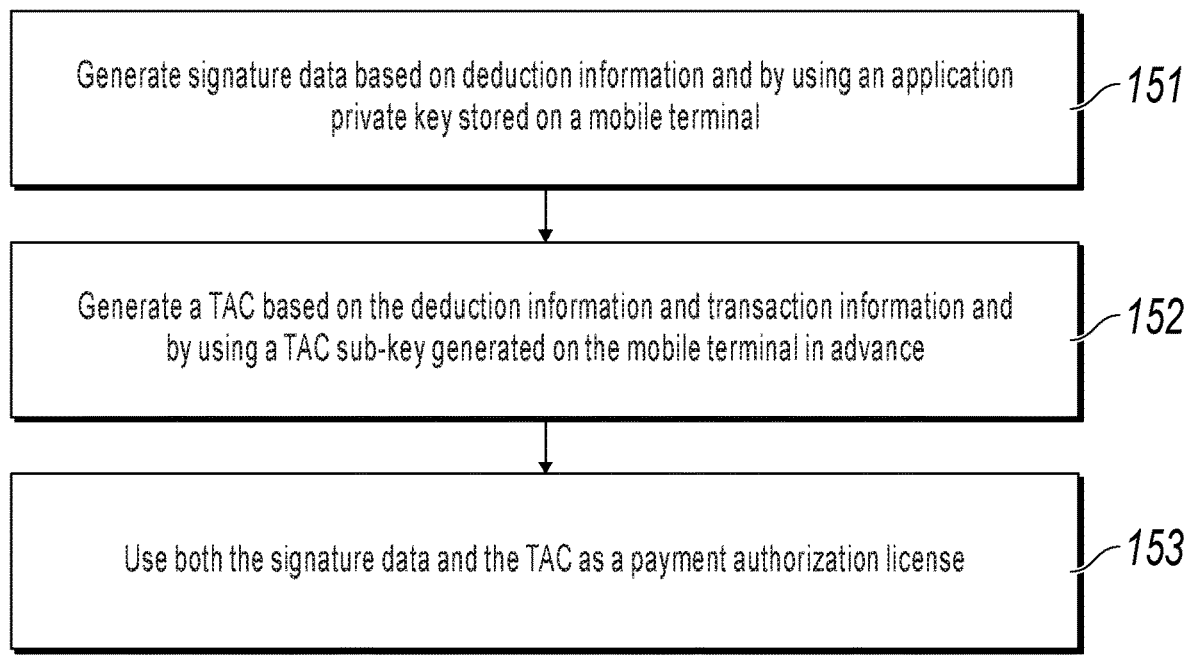
FIG. 11 is a flowchart illustrating step 150 in FIG. 10.

To describe in detail in the present implementation of the present disclosure, how the mobile terminal generates the payment authorization license so the transaction terminal can complete the current payment transaction based on the authorization license sent by the mobile terminal, based on FIG. 10, in another implementation of the present disclosure, as shown in FIG. 11, step 150 can further include the following steps.

Step 151: Generate signature data based on the deduction information and by using an application private key stored on the mobile terminal.

The application private key is generated in advance, and is stored on the mobile terminal. The credit payment application signs the deduction information by using the application private key, to generate the signature data. The deduction information includes deduction amount, a date and time of the current payment transaction, an entrance/exit flag of the current payment transaction, and station information of the current payment transaction.

Step 152: Generate a TAC based on the deduction information and the transaction information and by using a TAC sub-key generated on the mobile terminal in advance.

The credit payment application on the mobile terminal encrypts the deduction money, the date of the current payment transaction, the time of the current payment transaction, a payment card number, an available credit, and a credit limit based on the deduction information and transaction information, to generate the TAC. The credit limit is the maximum offline available money granted by the credit authorization system to the user.

Step 153: Use both the signature data and the TAC as the payment authorization license.

The credit payment application can separately send the signature data and the TAC used as the payment authorization license to the bus gate, or can send together the signature data and the TAC used as a credit authorization license to the bus gate.

In addition, the transaction information includes a payment card number, an available credit, an entrance/exit flag, and previous transaction information. The payment card number is a unique character code generated by the credit authorization system for a credit payment application of each user. The available credit is the amount of money that the user can currently spend. The TAC sub-key is obtained by the server of the credit authorization system through hashing based on the card number and by using a TAC parent key.

Based on FIG. 10, the method can further include the following steps.

Step 11: Subtract the deduction amount from an available credit in the transaction information based on the deduction amount in the deduction information of the current pay transaction, to obtain a currently available credit.

Step 12: Use the currently available credit as an available credit corresponding to a user on the mobile terminal. Then, step S150 is performed.

Figure 12:
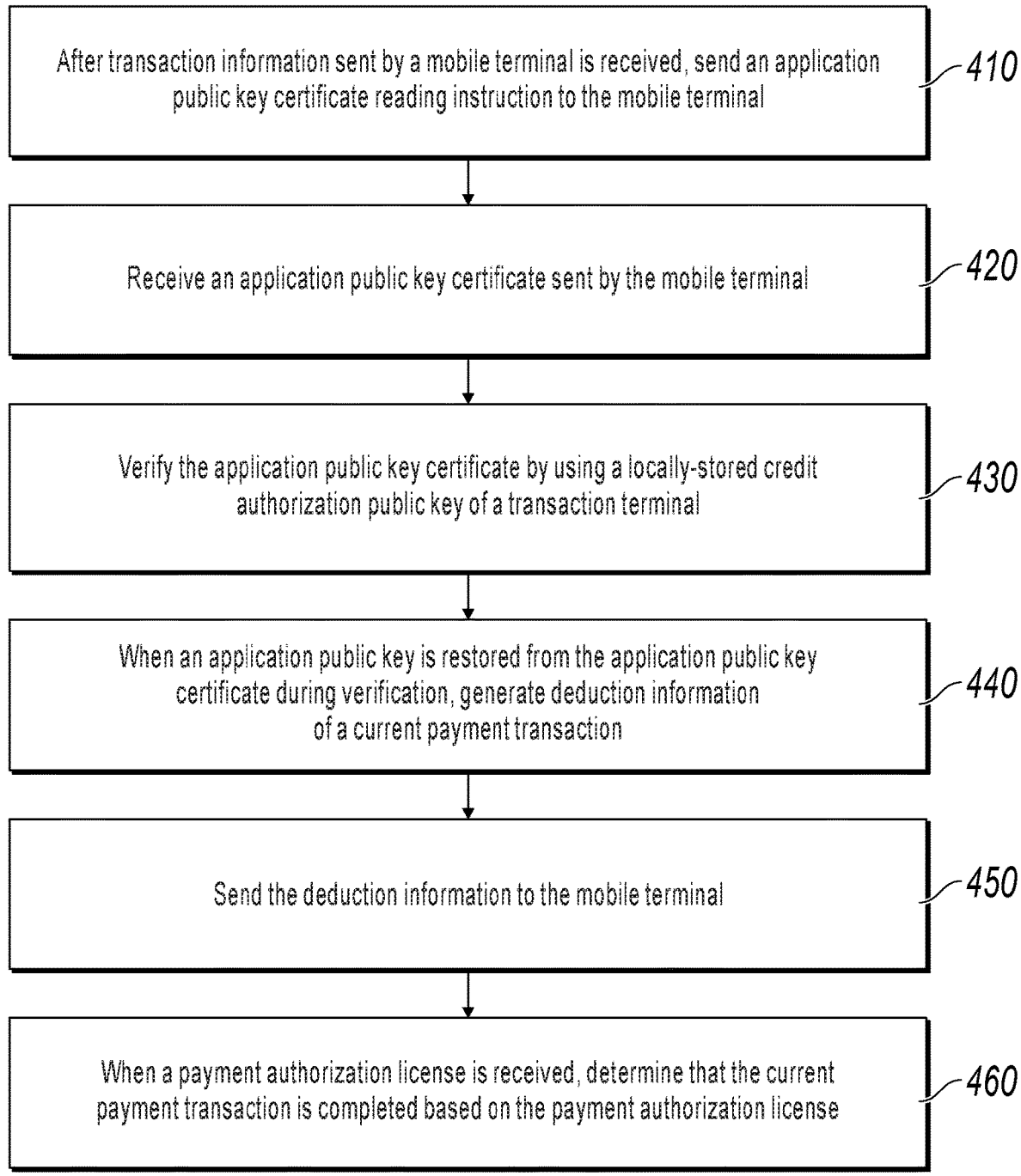
FIG. 12 is a flowchart illustrating a credit payment method based on card emulation of a mobile terminal, according to yet another example implementation.

To describe a transaction payment process between the mobile terminal and the transaction terminal in detail, an implementation of the present disclosure provides an execution procedure of the credit payment method based on card emulation of a mobile terminal on the transaction terminal. As shown in FIG. 12, the method can include the following steps.

Step 410: After transaction information sent by a mobile terminal is received, send an application public key certificate reading instruction to the mobile terminal.

A bus gate receives the transaction information sent by the mobile terminal, and the transaction information includes a payment card number, an available credit, an entrance/exit flag, and previous transaction information. The bus gate checks content in the transaction information, for example, checks information such as an available credit of a corresponding account of the mobile terminal and the an entrance/exit flag. After the check succeeds, the bus gate sends the application public key certificate reading instruction to the mobile terminal.

Step S420: Receive an application public key certificate sent by the mobile terminal.

After the bus gate sends the application public key certificate reading instruction to the mobile terminal, the mobile terminal sends the application public key certificate to the bus gate based on the instruction. The bus gate receives the application public key certificate sent by the mobile terminal.

Step 430: Verify the application public key certificate by using a locally-stored credit authorization public key of a transaction terminal.

To identify whether the received application public key certificate is correct and to use related information in the public key certificate, the application public key certificate needs to be verified by using the credit authorization public key. The credit authorization public key can be stored on the bus gate in advance.

Step 440: When an application public key is restored from the application public key certificate during verification, generate deduction information of a current payment transaction.

The bus gate verifies the application public key certificate sent by the mobile terminal, and if the verification fails, ends the current payment transaction. If the application public key is restored from the application public key certificate, it indicates that the verification succeeds, and the deduction information of the current payment transaction is generated. It is worthwhile to note that the deduction information of the current payment transaction can also be referred to as a deduction instruction, and intends to generate a payment authorization license after the mobile terminal receives the deduction information (the deduction instruction) sent by the bus gate.

The deduction information of the current payment transaction includes a deduction amount, a date of the current payment transaction, a time of the current payment transaction, entrance/exit flag of the current payment transaction, and station information of the current payment transaction. The deduction money is calculated by the bus gate based on information such as the entrance/exit flag of the current payment transaction.

Step 450: Send the deduction information to the mobile terminal.

The bus gate sends the generated deduction information to the mobile terminal, so that after receiving the deduction information, the mobile terminal generates the payment authorization license based on the deduction information and the transaction information and by using the credit payment application installed on the mobile terminal.

Step 460: When a payment authorization license is received, determine that the current payment transaction is completed based on the payment authorization license.

The payment authorization license includes signature data and a TAC. The bus gate verifies the signature data in the payment authorization license, if the verification fails, ends the current payment transaction, and if the verification succeeds, records a transaction log of the current payment transaction.

Figure 13:
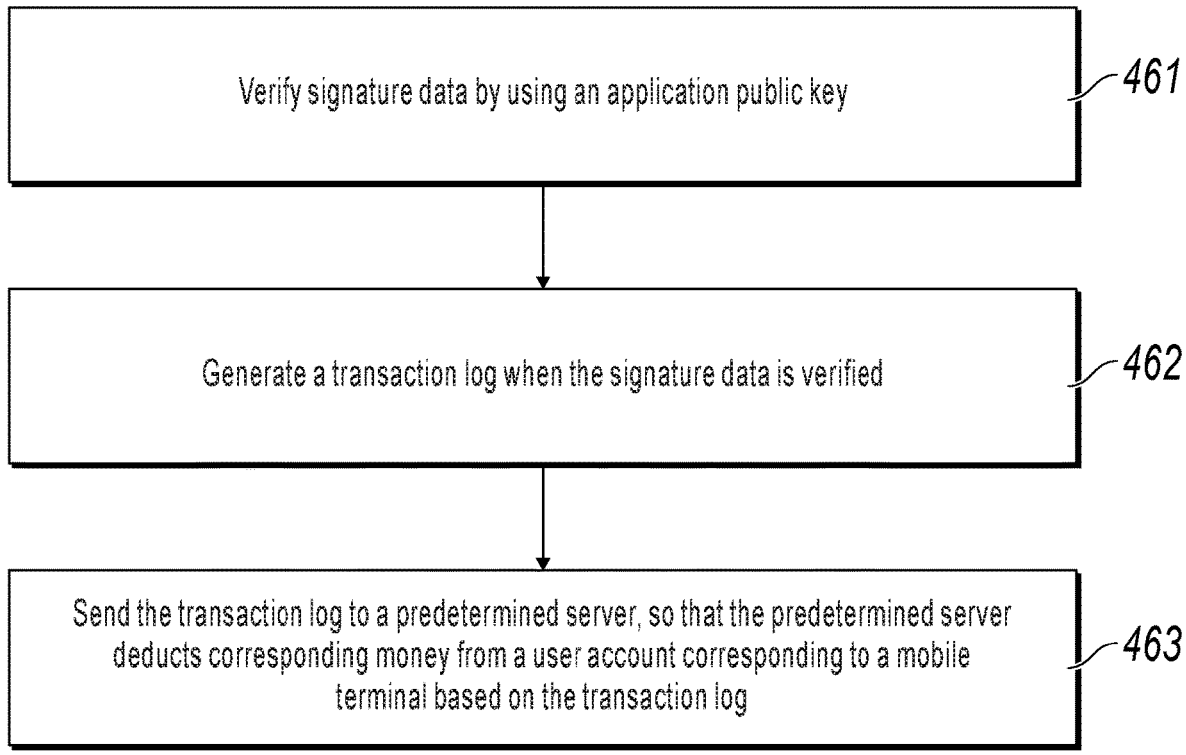
FIG. 13 is a flowchart illustrating step 460 in FIG. 12.

To describe in detail how the transaction terminal completes the current payment transaction based on the authentication license sent by the mobile terminal in the present implementation of the present disclosure, based on FIG. 12, in another implementation of the present disclosure, as shown in FIG. 13, step 460 can further include the following steps.

Step 461: Verify the signature data by using the application public key.

The application public key is restored by the bus gate from the payment authorization license sent by the mobile terminal. The bus gate checks, by using the application public key, whether related information in the signature data matches corresponding information in the application public key, and if yes, determines that the verification succeeds.

Step 462: Generate a transaction log when the signature data is verified.

After successfully verifying the signature data, the bus gate generates the transaction log of the current payment. The transaction log includes a deduction amount, a transaction date, a transaction time, a transaction terminal ID, a payment card number, an available credit, and a TAC.

Step 463: Send the transaction log to a predetermined server, so that the predetermined server deducts corresponding money from a user account corresponding to the mobile terminal based on the transaction log.

Figure 14:
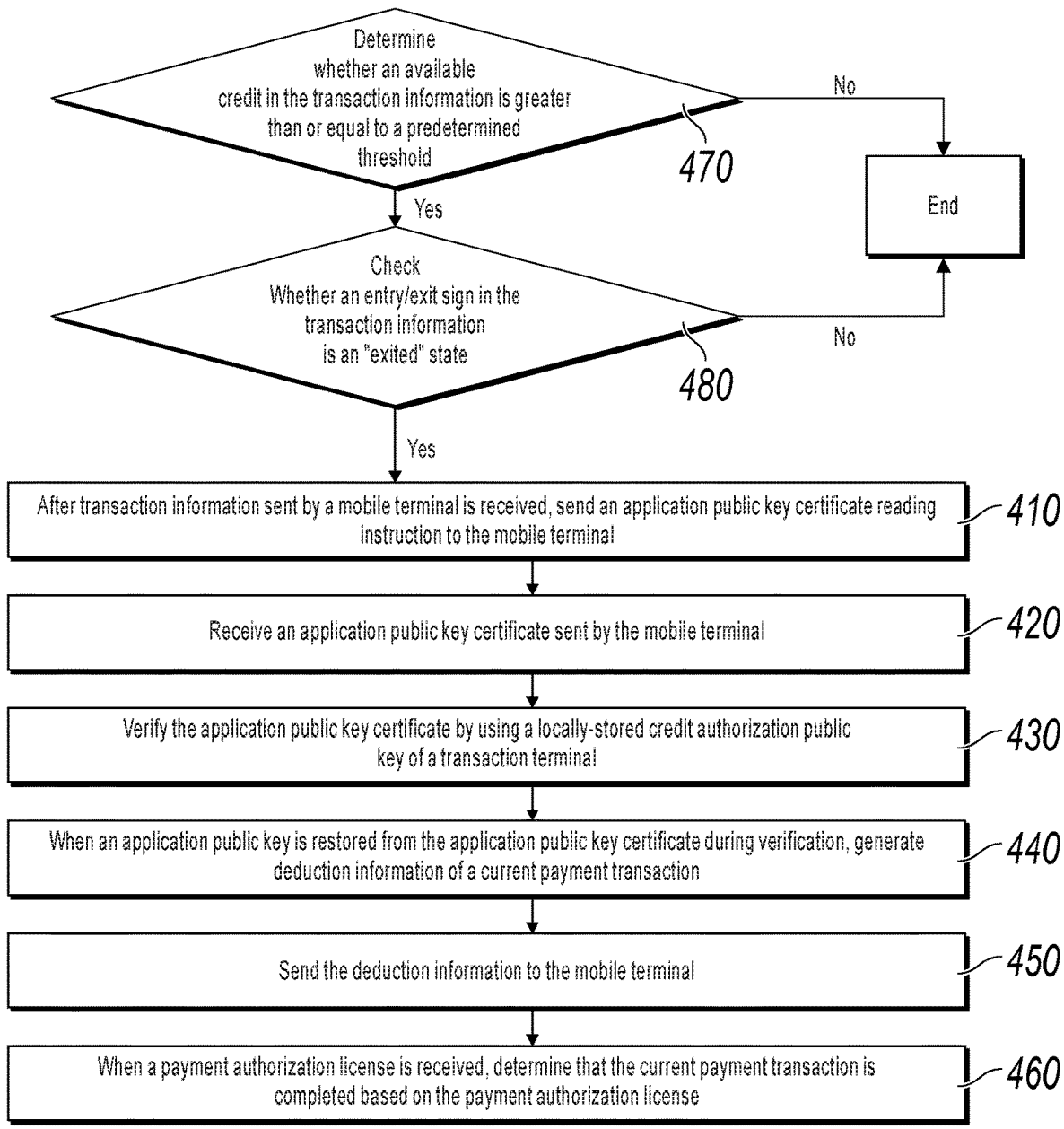
FIG. 14 is a flowchart illustrating a credit payment method based on card emulation of a mobile terminal, according to yet another example implementation.

As shown in FIG. 14, in another implementation of the present disclosure, an execution procedure of the credit payment method based on card emulation of a mobile terminal on the transaction terminal in the present implementation of the present disclosure can further include the following steps.

Step 470: Determine whether an available credit in the transaction information is greater than or equal to a predetermined threshold.

If the available credit is greater than or equal to the predetermined threshold, step 480 is performed.

Step 480: Check whether an entrance/exit flag in the transaction information is an "entered" state.

If the entrance/exit flag is the "exited" state, step 410 is performed.

Step 470 is mainly used by the bus gate to check, based on the transaction information sent by the mobile terminal, whether the available credit of the user account corresponding to the mobile terminal is enough for paying for the current payment transaction. If the available credit is not enough, the current payment transaction is rejected. If the available amount is enough, the bus gate checks whether the entrance/exit flag in the transaction information is 0. If the entrance/exit flag is not 0, the current payment transaction is rejected. If the entrance/exit flag is 0, the current payment transaction continues. It is worthwhile to note that "1" in the entrance/exit flag indicates that the mobile terminal is in an "entered" state, and the current payment transaction is rejected. "0" in the entrance/exit flag indicates that the mobile terminal is in an "exited" state, and the current payment transaction can be made.

The transaction information includes a payment card number, an available credit, an entrance/exit flag and previous transaction information.

Figure 15:
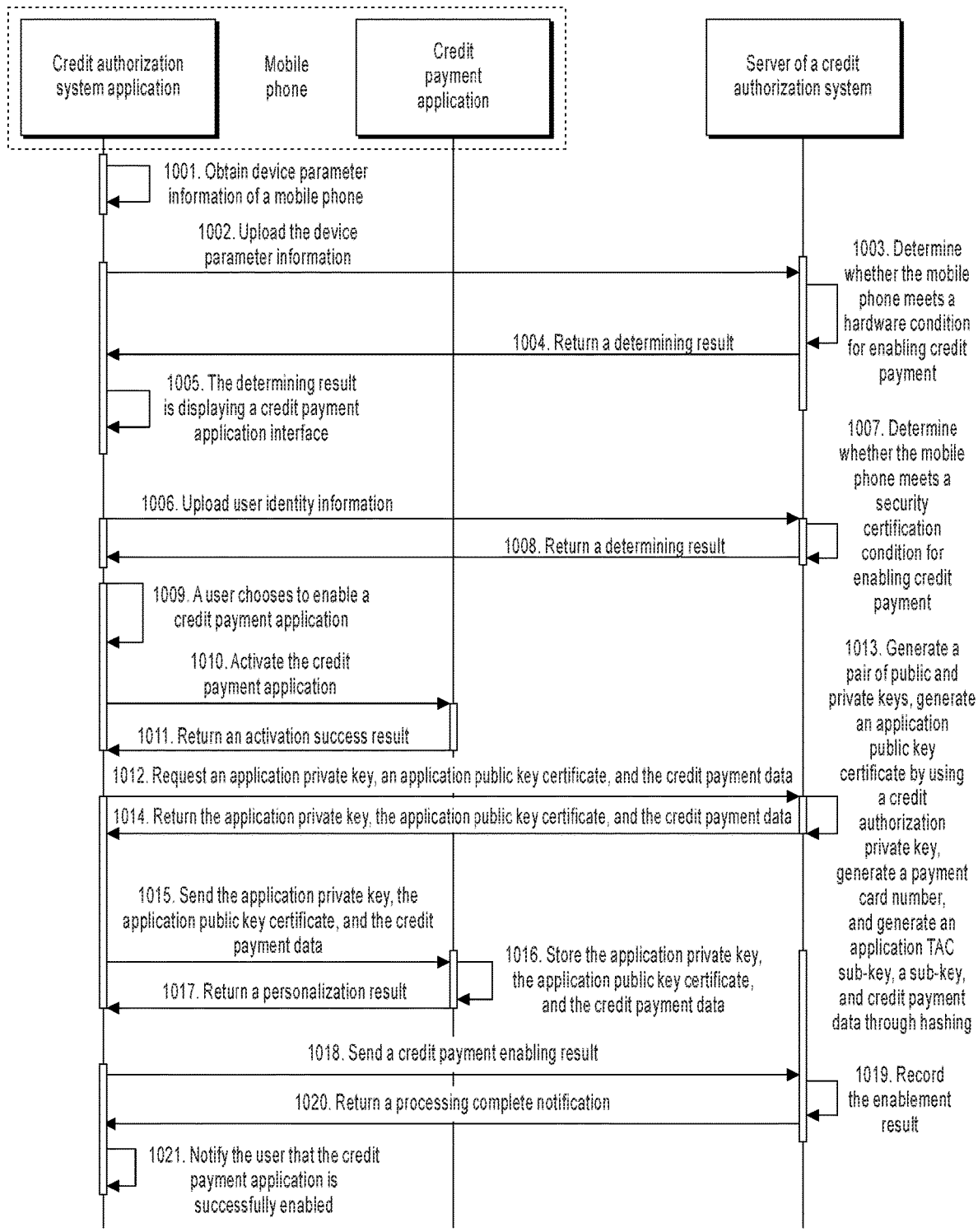
FIG. 15 is a signaling diagram among a credit authorization system application, a credit payment application, and a server of a credit authorization system.

In another implementation, as shown in FIG. 15, the present disclosure provides a credit payment method based on card emulation of a mobile terminal. In this implementation, a mobile phone represents a mobile terminal, and a server of a credit authorization system represents a server. When the mobile phone enables a credit payment function, a procedure among a credit authorization system application on the mobile phone, a credit payment application on the mobile phone, and the server of the credit authorization system includes the following steps:

Step 1001: Obtain device parameter information of the mobile phone.

Step 1002: Upload the device parameter information.

Step 1003: Determine whether the mobile phone meets a hardware condition for enabling credit payment.

Step 1004: Return a determining result.

Step 1005: The determining result is displaying a credit payment application interface.

Step 1006: Upload user identity information.

Step 1007: Determine whether the mobile phone meets a security certification condition for enabling credit payment.

Step 1008: Return a determining result.

Step 1009: A user chooses to enable a credit payment application.

Step 1010: Activate the credit payment application.

Step 1011: Return an activation success result.

Step 1012: Request an application private key, an application public key certificate, and credit payment data.

Step 1013: Generate a pair of public and private keys, generate an application public key certificate by using a credit authorization private key, generate a payment card number, and generate an application TAC sub-key, a sub-key, and credit payment data through hashing.

Step 1014: Return the application private key, the application public key certificate, and the credit payment data.

Step 1015: Send the application private key, the application public key certificate, and the credit payment data.

Step 1016: Store the application private key, the application public key certificate, and the credit payment data.

Step 1017: Return a personalization result.

Step 1018: Send a credit payment enablement result.

Step 1019: Record the enablement result.

Step 1020: Return a processing completion notification.

Step 1021: Notify the user that the credit payment application is successfully enabled.

Figure 16:
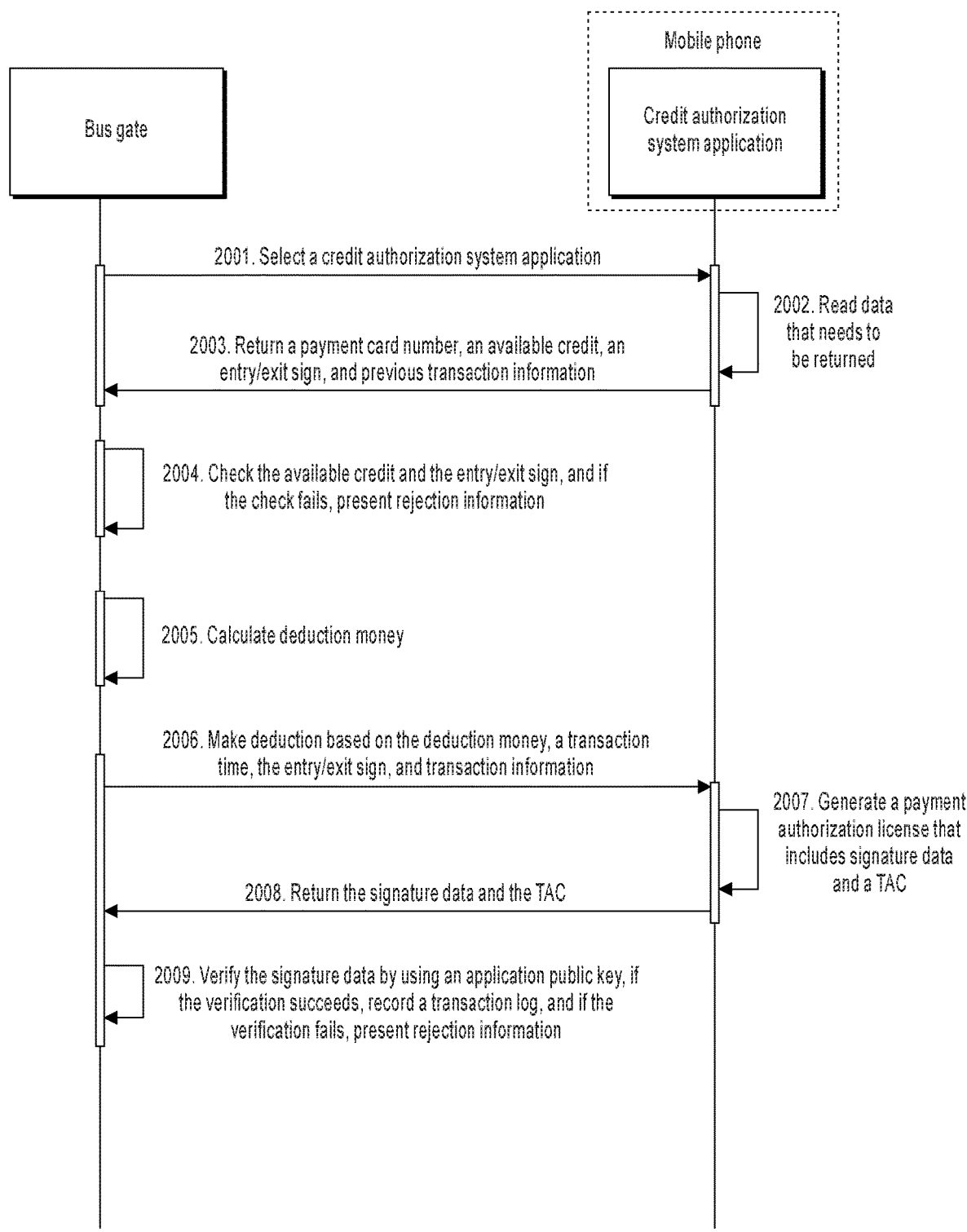
FIG. 16 is a signaling diagram of data exchange between a mobile terminal and a bus gate.

In another implementation of the present disclosure, as shown in FIG. 16, the present disclosure provides a credit payment method based on card emulation. In a process in which a mobile terminal performs payment transaction, a data exchange procedure between a mobile terminal and a bus gate in a payment transaction process is as follows:

Step 2001: The bus gate selects a credit authorization system application.

Step 2002: The credit authorization system application reads data that needs to be returned.

Step 2003: The credit authorization system application returns a payment card number, an available credit, an entrance/exit flag, and previous transaction information.

Step 2004: The bus gate checks the available credit and the entrance/exit flag, and if the check fails, presents rejection information.

Step 2005: The bus gate calculates deduction money.

Step 2006: The bus gate makes a deduction based on the deduction money, a transaction time, the entrance/exit flag, and transaction information.

Step 2007: The credit authorization system application generates a payment authorization license that includes signature data and a TAC.

Step 2008: The credit authorization system application returns the signature data and the TAC.

Step 2009: The bus gate verifies the signature data by using an application public key, if the verification succeeds, records a transaction log, and if the verification fails, presents rejection information.

Figure 17:
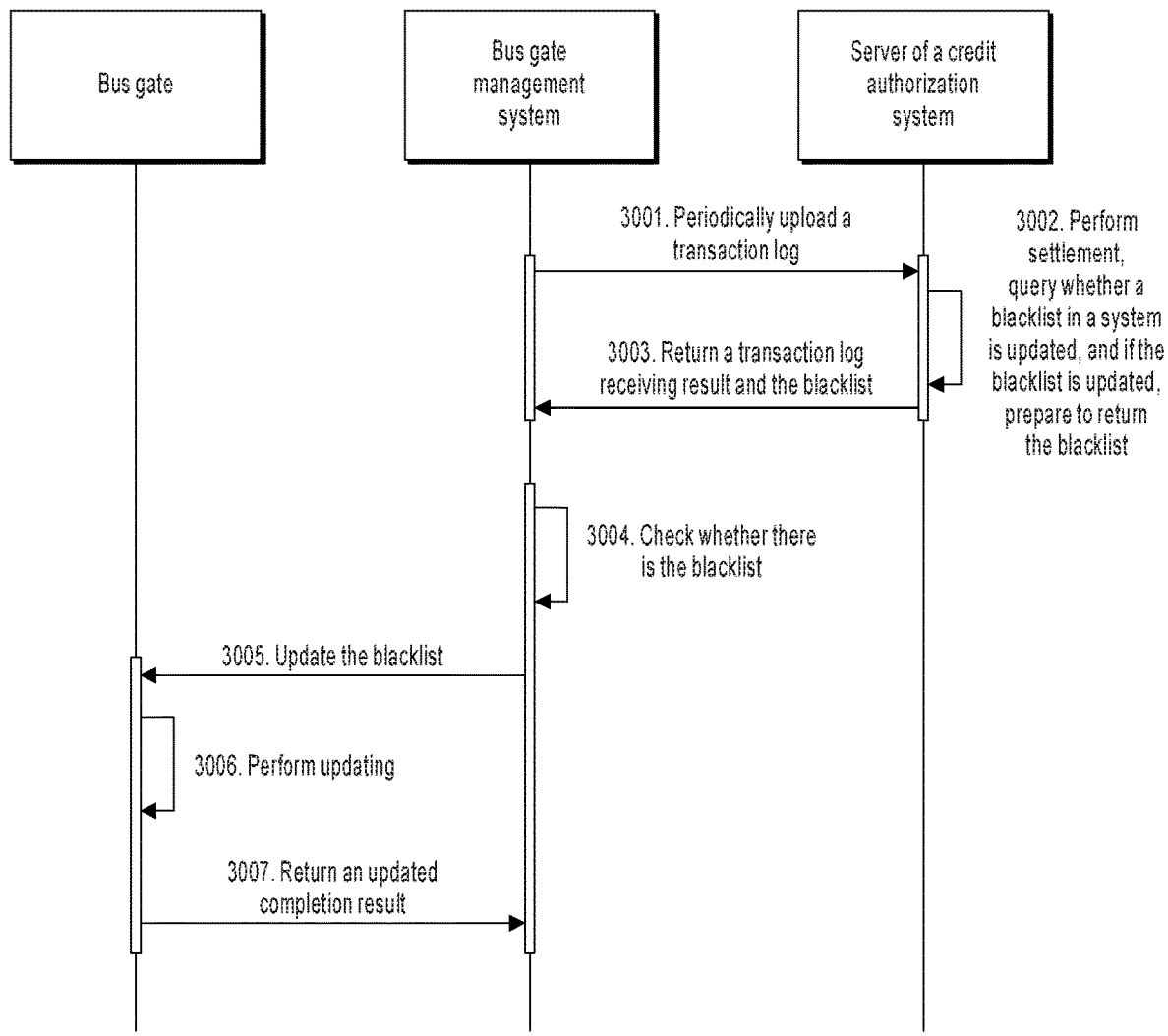
FIG. 17 is a signaling diagram of data exchange between a bus gate and a server of a credit authorization system.

In addition, as shown in FIG. 17, the bus gate further needs to periodically upload a transaction log to the credit authorization system, and update a blacklist. In the credit payment method based on card emulation of a mobile terminal in the present disclosure, a data exchange procedure between a bus gate (a transaction terminal) and a server of a credit authorization system is as follows:

Step 3001: Periodically upload a transaction log.

Step 3002: Perform settlement, query whether a blacklist in the system is updated, and if the blacklist is updated, and prepare to return the blacklist.

Step 3003: Return a transaction log receiving results and the blacklist.

Step 3004: Check whether there is the blacklist.

Step 3005: The bus gate updates the blacklist.

Step 3006: Perform updating.

Step 3007: Return an updated completion result.

Based on the previous descriptions of the method implementations, a person skilled in the art can clearly understand that the present disclosure can be implemented by using software and a necessary universal hardware, and can certainly be implemented by hardware, but in many circumstances, the former is a preferred implementation. Based on such an understanding, the technical solutions of the present disclosure essentially, or the part contributing to the existing technology can be implemented in a form of a software product. The software product is stored in a storage medium, and includes several instructions for instructing a computer device (which can be a personal computer, a server, or a network device) to perform all or some of the steps of the methods described in the implementations of the present disclosure. The storage medium includes various medium that can store program code, such as a read-only memory (ROM), a random access memory (RAM), a magnetic disk, or an optical disc.

The implementations of the present disclosure are described above by using credit payment for a bus as an example. It can be understood that the credit payment can be applied to another payment scenario as needed, for example, a subway payment and offline shopping payment scenario. There can be different implementations in specific application scenarios.

Figure 18:
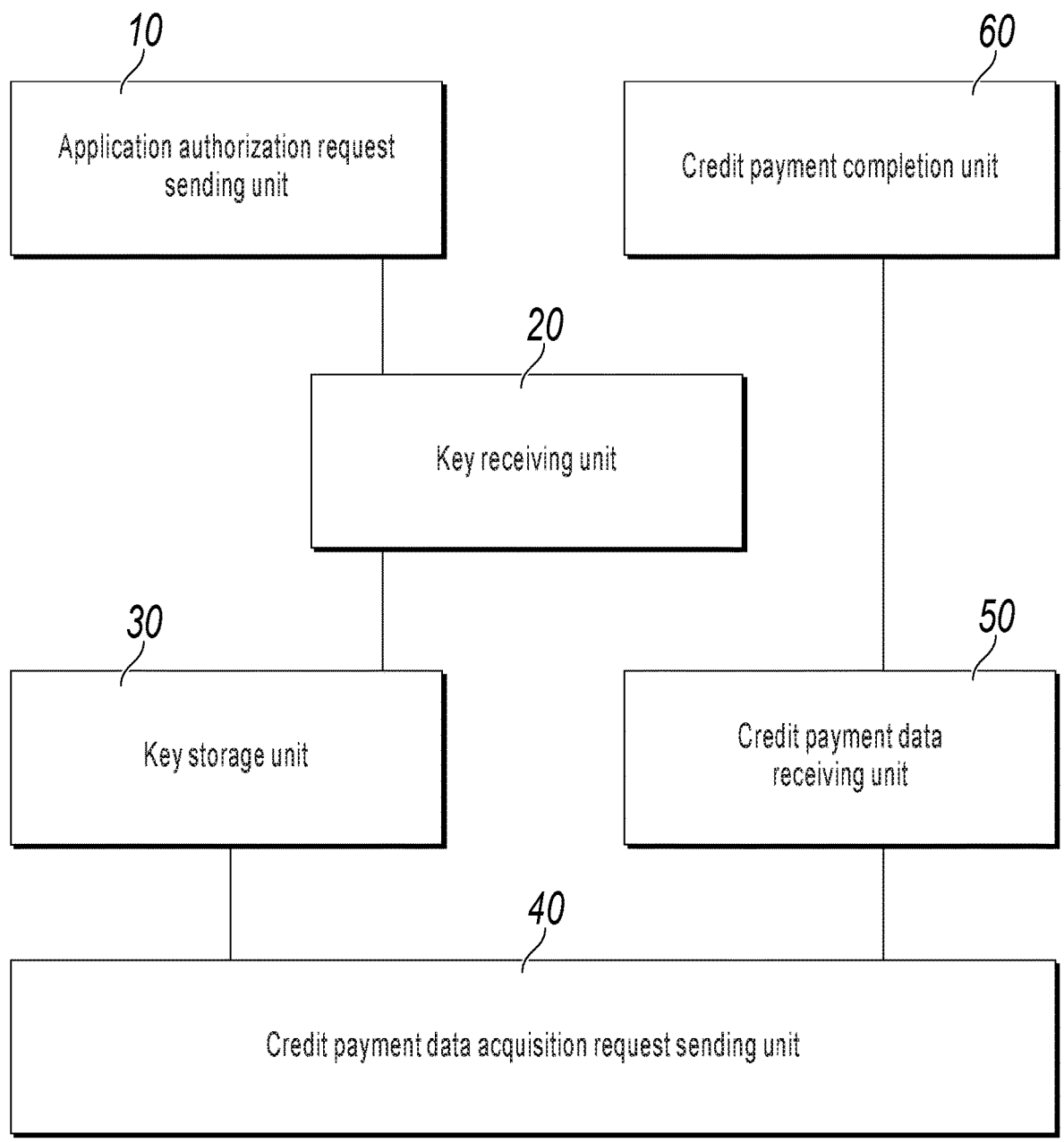
FIG. 18 is a schematic diagram illustrating a credit payment device based on card emulation of a mobile terminal, according to an example implementation.

In addition, as an implementation of the previous embodiments, an implementation of the present disclosure further provides a credit payment device based on card emulation of a mobile terminal. The device is located on a mobile terminal. As shown in FIG. 18, the device includes an application authorization request sending unit 10, a key receiving unit 20, a key storage unit 30, a credit payment data acquisition request sending unit 40, a credit payment data receiving unit 50, and a credit payment completion unit 60.

The application authorization request sending unit 10 is configured to send an application authorization request to a predetermined server by using a credit authorization system application on the mobile terminal.

The key receiving unit 20 is configured to receive an application public key certificate and an application private key sent by the predetermined server.

The key storage unit 30 is configured to store the application public key certificate and the application private key in a credit payment application of the mobile terminal.

The credit payment data acquisition request sending unit 40 is configured to send a credit payment data acquisition request to the predetermined server.

The credit payment data receiving unit 50 is configured to receive credit payment data sent by the predetermined server.

The credit payment completion unit 60 is configured to enable a credit payment function of the mobile terminal based on the credit payment data.

Figure 19:
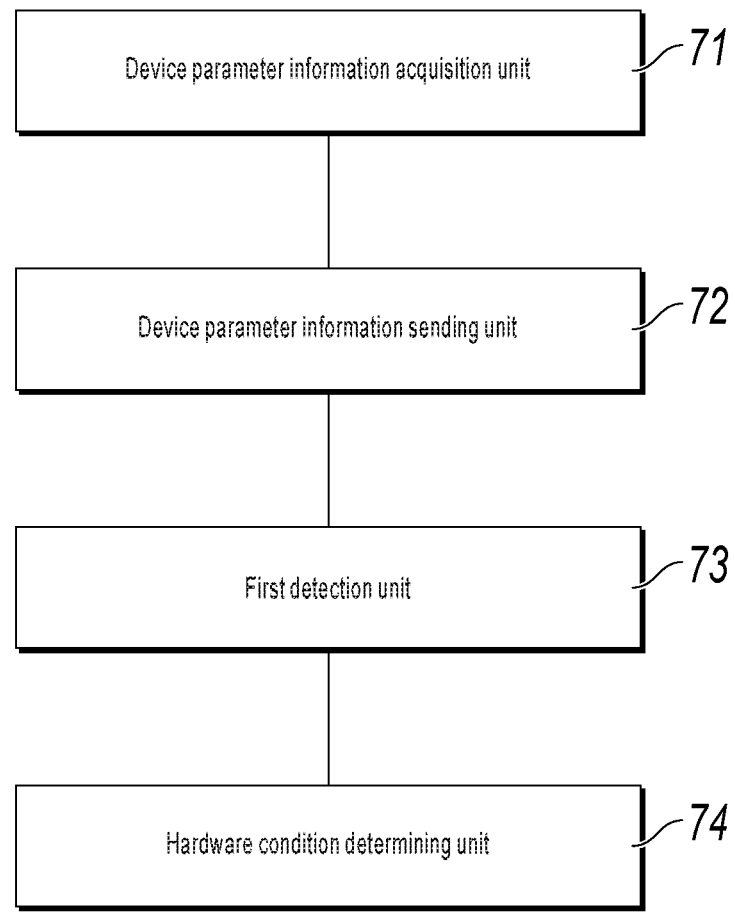
FIG. 19 is a schematic diagram illustrating a credit payment device based on card emulation of a mobile terminal, according to another example implementation.

In another implementation of the present disclosure, based on FIG. 18, as shown in FIG. 19, the device further includes: a device parameter information acquisition unit 71, configured to obtain device parameter information of the mobile terminal; a device parameter information sending unit 72, configured to send the device parameter information to the predetermined server, so that the predetermined server determines, based on the received device parameter information, whether the mobile terminal meets a hardware condition for enabling credit payment; a first detection unit 73, configured to detect whether credit payment enablement information sent by the predetermined server is received; and a hardware condition determining unit 74, configured to: when the credit payment enablement information sent by the predetermined server is received, determine that the mobile terminal meets the hardware condition for enabling credit payment.

Figure 20:
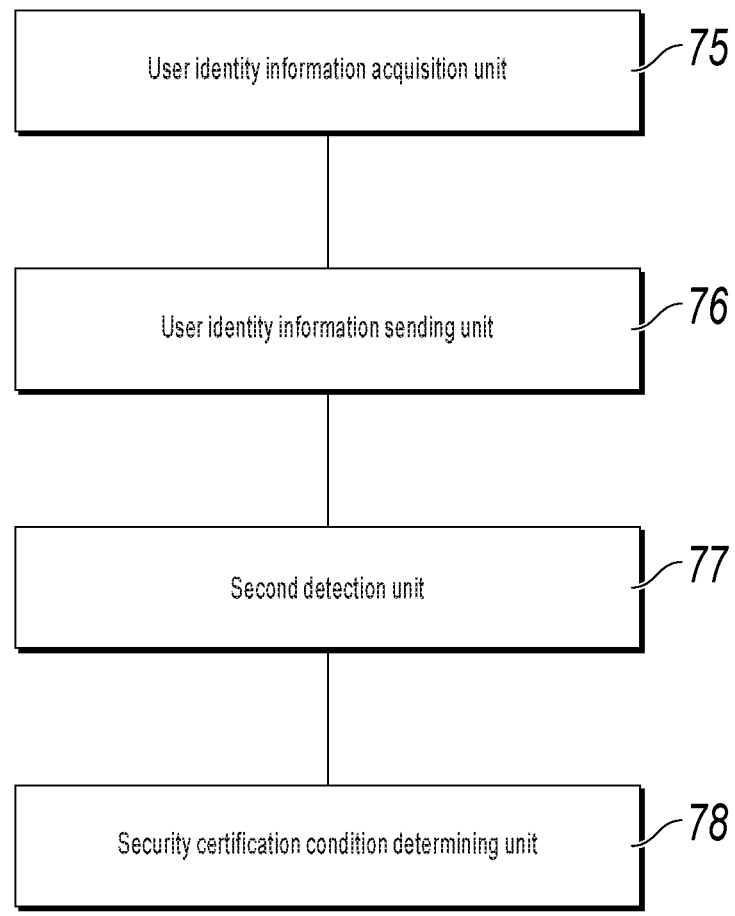
FIG. 20 is a schematic diagram illustrating a credit payment device based on card emulation of a mobile terminal, according to another example implementation.

In another implementation of the present disclosure, based on FIG. 18, as shown in FIG. 20, the device further includes: a user identity information acquisition unit 75, configured to obtain user identity information; a user identity information sending unit 76, configured to send the user identity information to the predetermined server, so that the predetermined server determines, based on the received user identity information, whether the mobile terminal meets a security certification condition for enabling credit payment; a second detection unit 77, configured to detect whether security certification success information sent by the predetermined server is received; and a security certification condition determining unit 78, configured to: when the security certification success information sent by the predetermined server is received, determines that the mobile terminal meets the security certification condition for enabling credit payment.

Figure 21:
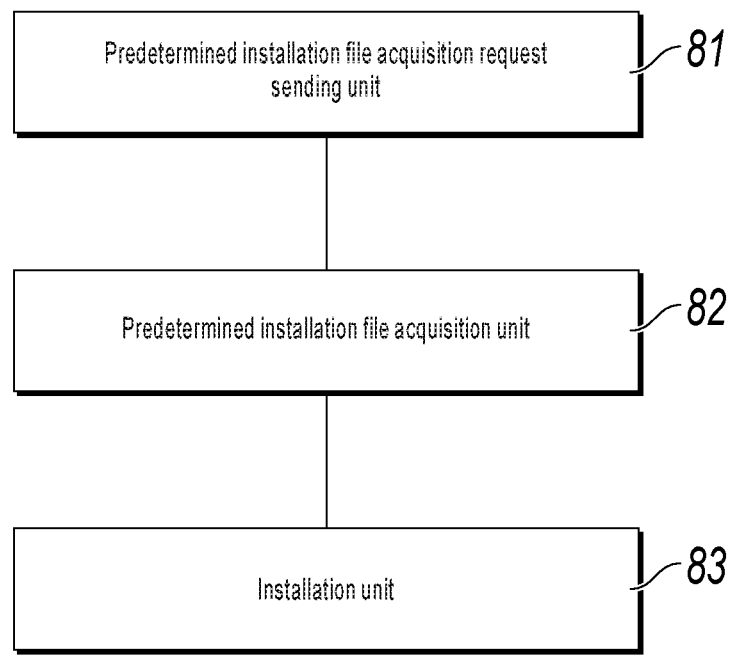
FIG. 21 is a schematic diagram illustrating a credit payment device based on card emulation of a mobile terminal, according to another example implementation.

In another implementation of the present disclosure, based on FIG. 18, as shown in FIG. 21, the device further includes: a predetermined installation file acquisition request sending unit 81, configured to send a request for obtaining a predetermined installation file to the predetermined server, where the predetermined installation file includes a credit payment installation file; a predetermined installation file acquisition unit 82, configured to obtain the predetermined installation file sent by the predetermined server; and an installation unit 83, configured to install the predetermined installation file on the mobile terminal.

Figure 22:
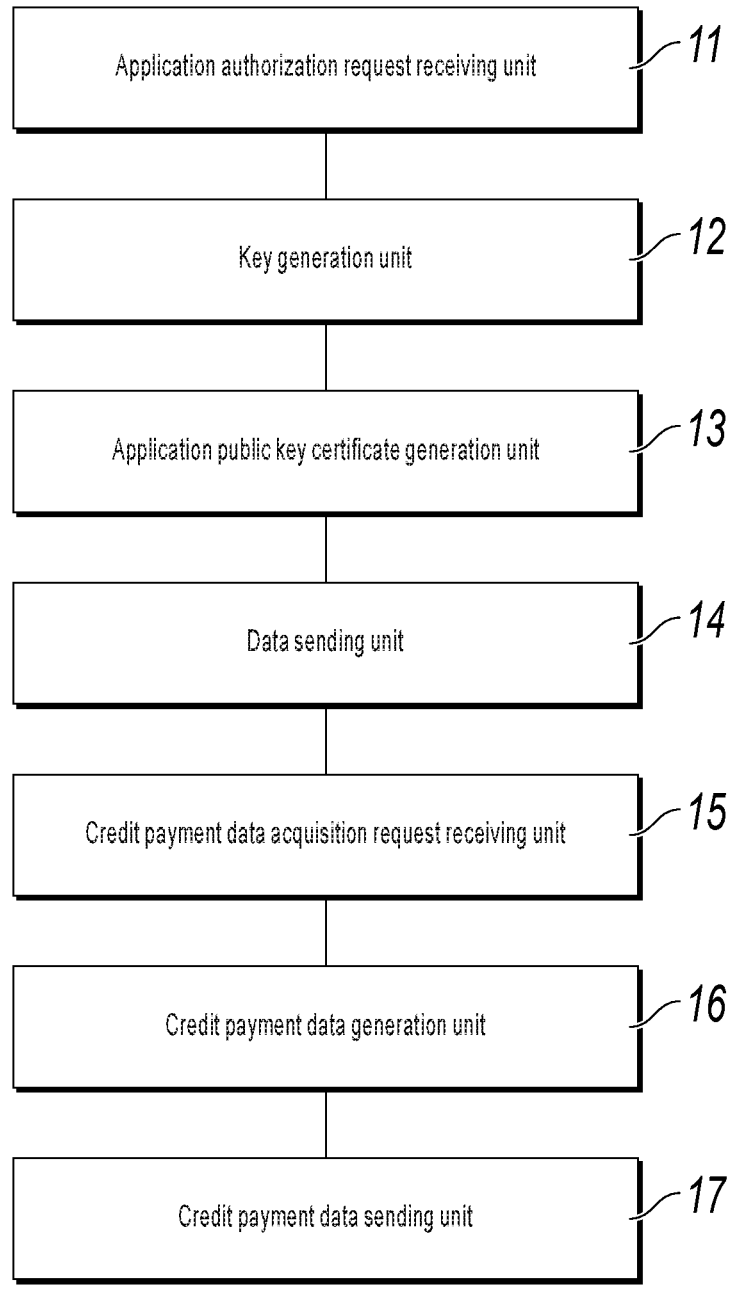
FIG. 22 is a schematic diagram illustrating a credit payment device based on card emulation of a mobile terminal, according to another example implementation.

An implementation of the present disclosure further provides a credit payment device based on card emulation of a mobile terminal. The device is on a transaction terminal. As shown in FIG. 22, the device includes an application authorization request receiving unit 11, a key generation unit 12, an application public key certificate generation unit 13, a data sending unit 14, a credit payment data acquisition request receiving unit 15, a credit payment data generation unit 16, and a credit payment data sending unit 17.

The application authorization request receiving unit 11 is configured to receive an application authorization request sent by a mobile terminal.

The key generation unit 12 is configured to separately generate an application public key and an application private key based on the application authorization request.

The application public key certificate generation unit 13 is configured to sign the application public key by using a credit authorization private key stored on a predetermined server, to generate an application public key certificate.

The data sending unit 14 is configured to send the application public key certificate and the application private key to the mobile terminal.

The credit payment data acquisition request receiving unit 15 is configured to receive a credit payment data acquisition request sent by the mobile terminal.

The credit payment data generation unit 16 is configured to generate credit payment data corresponding to the mobile terminal based on the credit payment data acquisition request.

The credit payment data sending unit 17 is configured to send the credit payment data to the mobile terminal, so that the mobile terminal enables a credit payment function of the mobile terminal based on the received credit payment data.

Figure 23:
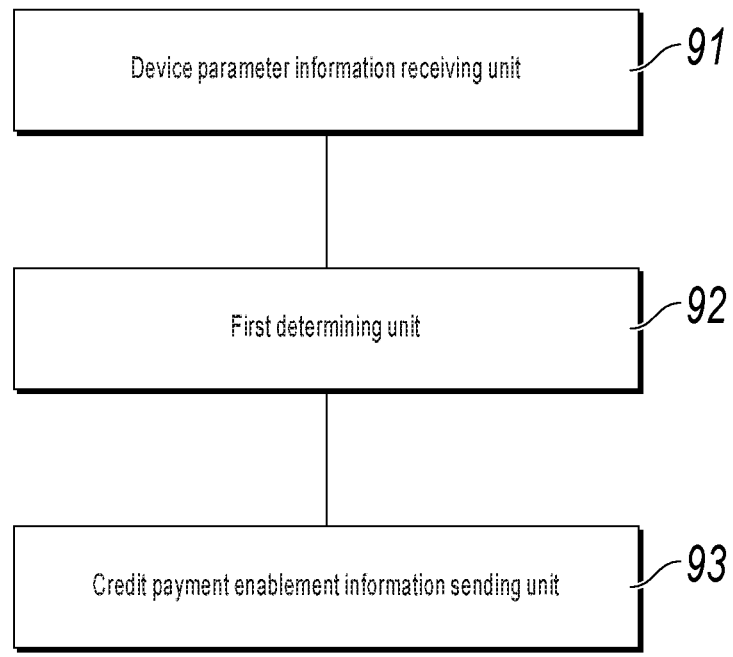
FIG. 23 is a schematic diagram illustrating a credit payment device based on card emulation of a mobile terminal, according to another example implementation.

In another implementation of the present disclosure, based on FIG. 22, as shown in FIG. 23, the device further includes: a device parameter information receiving unit 91, configured to receive device parameter information sent by the mobile terminal; a first determining unit 92, configured to determine, based on the device parameter information, whether the mobile terminal meets a hardware condition for enabling credit payment; and a credit payment enablement information sending unit 93, configured to: when the mobile terminal meets the hardware condition for enabling credit payment, send credit payment enablement information to the mobile terminal.

Figure 24:
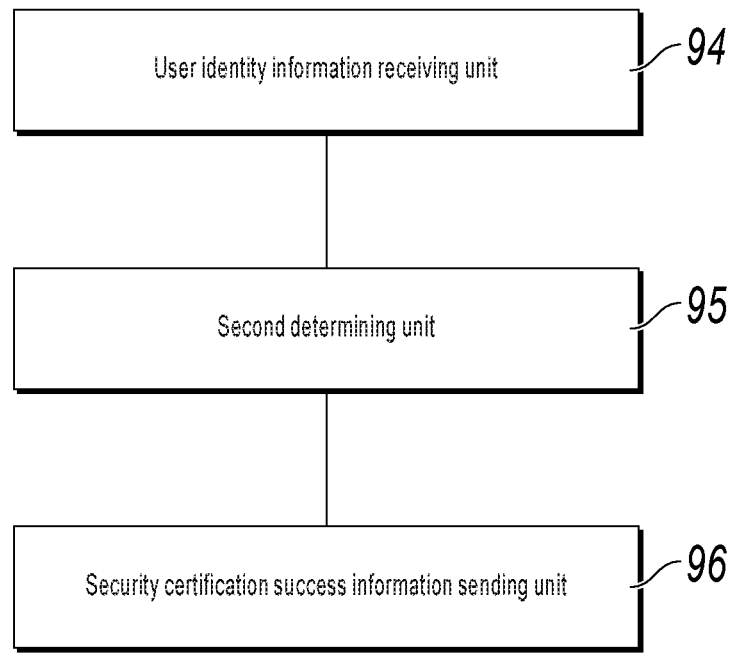
FIG. 24 is a schematic diagram illustrating a credit payment device based on card emulation of a mobile terminal, according to another example implementation.

In another implementation of the present disclosure, based on FIG. 22, as shown in FIG. 24, the device further includes: a user identity information receiving unit 94, configured to receive user identity information sent by the mobile terminal; a second determining unit 95, configured to determine, based on the user identity information, whether the mobile terminal meets a security certification condition for enabling credit payment; and a security certification success information sending unit 96, configured to: when the mobile terminal meets the security certification condition for enabling credit payment, send security certification success information to the mobile terminal.

Figure 25:
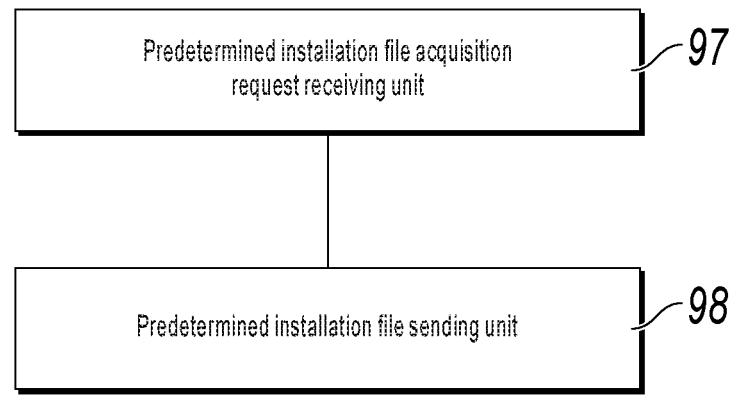
FIG. 25 is a schematic diagram illustrating a credit payment device based on card emulation of a mobile terminal, according to another example implementation.

In another implementation of the present disclosure, based on FIG. 19, as shown in FIG. 25, the device further includes: a predetermined installation file acquisition request receiving unit 97, configured to receive a request for obtaining a predetermined installation file and sent by the mobile terminal, where the predetermined installation file includes a credit payment installation file; and a predetermined installation file sending unit 98, configured to send the predetermined installation file to the mobile terminal based on the request for obtaining a predetermined installation file.

Specific methods of execution operations of the modules in the device in the previous implementations are described in detail in corresponding method implementations, and details are not described here.

The credit payment method and device based on card emulation of a mobile terminal provided in the present disclosure can be applied to a mobile terminal and a transaction terminal. After enabling a payment application, a user can complete offline credit payment on the transaction terminal by using the mobile terminal, to quickly and securely complete a payment transaction. Online payment is not needed. As such, unlike the existing technologies, the user can complete the payment transaction without using cash or a public transportation card when taking a public transport vehicle.

It can be understood that the present disclosure can be applied to environments or configurations of a plurality of universal or dedicated computing systems. For example, a personal computer, a server computer, a handheld device or a portable device, a flat panel device, a multi-processor system, a microprocessor-based system, a set-top box, a programmable consumer electronic device, a network PC, a minicomputer, a mainframe computer, and a distributed computing environment including any one of the previous system or device.

The present disclosure can be described in the general context of executable computer instructions executed by a computer, for example, a program module. Generally, the program unit includes a routine, a program, an object, a component, a data structure, and the like for executing a particular task or implementing a particular abstract data type. The present disclosure can also be practiced in distributed computing environments that tasks are executed by remote processing devices connected through a communications network. In a distributed computing environment, the program module can be located in both local and remote computer storage media including storage devices.

It is worthwhile to note that in the present specification, relational terms such as "first" and "second" are only used to distinguish one entity or operation from another, and do not necessarily require or imply that any actual relationship or sequence exists between these entities or operations. In addition, the terms "include", "comprise", or any other variants mean to cover the non-exclusive inclusion, so that a process, a method, an article, or a device that includes a list of elements not only includes those elements but also includes other elements not expressly listed, or further includes elements inherent to such process, method, article, or device. An element preceded by "includes a . . . " does not, without more constraints, preclude the existence of additional identical elements in the process, method, article, or device that includes the element.

A person skilled in the art can easily figure out another implementation solution of the present disclosure after considering the specification and practicing the present disclosure disclosed here. The present application is intended to cover any variations, functions, or adaptive changes of the present disclosure. These variations, functions, or adaptive changes comply with general principles of the present disclosure, and include common knowledge or a commonly used technical means in the technical field not disclosed in the present disclosure. The specification and the implementations are merely considered as examples, and the actual scope and the spirit of the present disclosure are pointed out by the following claims.

It should be understood that the present disclosure is not limited to the accurate structures described in the foregoing and shown in the accompanying drawings, and modifications and changes can be made without departing from the scope of the present disclosure. The scope of the present disclosure is limited only by the appended claims.

Figure 26:
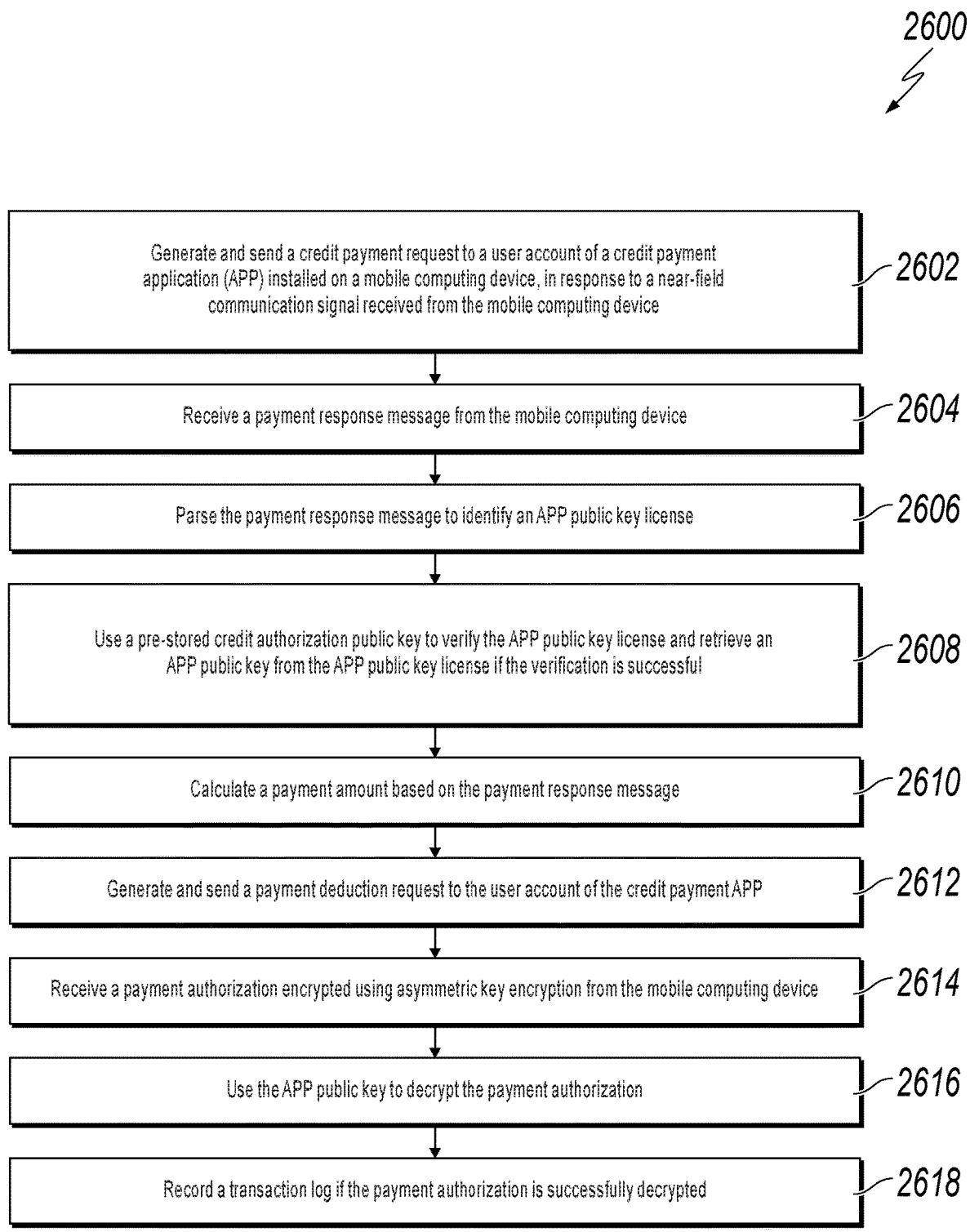
FIG. 26 is a flowchart illustrating an example of a method for collecting mobile credit payment using a payment collection device, according to an implementation of the present disclosure.

FIG. 26 is a flowchart illustrating an example of a method 2600 for collecting mobile credit payment using a payment collection device, according to an implementation of the present disclosure. For clarity of presentation, the description that follows generally describes method 2600 in the context of the other figures in this description. However, it will be understood that method 2600 can be performed, for example, by any system, environment, software, and hardware, or a combination of systems, environments, software, and hardware, as appropriate. In some implementations, various steps of method 2600 can be run in parallel, in combination, in loops, or in any order. In some implementations, method 2600 can be performed by a payment registration or collection device such as a gate scanner device, at a public transportation station.

At 2602, a credit payment request is generated and sent to a user account of a credit payment application (APP) installed on a mobile computing device, in response to a NFC signal received from the mobile computing device. In some implementations, the credit payment request can include an information field indicating that the credit payment request is a card information reading message for reading the APP public key license. From 2602, method 2600 proceeds to 2604.

At 2604, a payment response message is received from the mobile computing device. In some implementations, the payment response message can include at least one of a payment card number, an available balance, a station entrance/exit flag, or last transaction information. The station entrance/exit flag can indicate an entrance or exit status of a station and the last transaction information includes transaction date, transaction time, and station information. In some implementations, the payment response message is rejected if the card number is blacklisted, the available balance is less than a transaction amount, or the station entrance/exit flag does not match the mobile computing device's entrance or exit status. In some cases, the operations can be performed sequentially. For example, a gate scanner device can first determine if the card number is blacklisted. If not, the gate scanner device can determine whether the available balance is less than the transaction amount. If not, the gate scanner device can determine whether the station entrance/exit flag matches the mobile computing device's entrance or exit status. In some implementations, the station entrance/exit flag can have binary values. Value "1" can indicate that a user has entered into a public transportation station, while value "0" can indicate that the user has exited the public transportation station. As such, a user can be rejected from entering a station if the entrance/exit flag is "1," or rejected from exiting a station if the entrance/exit flag is "0". From 2604, method 2600 proceeds to 2606.

At 2606, the payment response message is parsed to identify an APP public key license. From 2606, method 2600 proceeds to 2608.

At 2608, a pre-stored credit authorization public key is used to verify the APP public key license and an APP public key is retrieved from the APP public key license if the verification is successful. Otherwise, the transaction can be rejected by the gate scanner device. From 2608, method 2600 proceeds to 2610.

At 2610, a payment amount is calculated based on the payment response message. From 2610, method 2600 proceeds to 2612.

At 2612, a payment deduction request is generated and sent to the user account of the credit payment APP. The payment deduction request can include an information field indicating at least one of a payment amount, transaction date and time, a station entrance/exit flag, or station information of a current transaction. After receiving the payment deduction request, the credit payment APP can use an APP private key to digitally sign at least one of the payment amount, transaction date and time, and station information of the current transaction to generate digitally signed data. The credit payment APP can also use TAC sub-key to digitally sign at least one of the payment amount, transaction date and time, payment card number, credit limit, or available balance information to generate a TAC. The digitally signed data and the TAC can form a payment authorization. In some implementations, the private key can be stored in an embedded secure element (eSE) of the mobile computing device and the TAC is generated based on at least part of the payment information by using a TAC sub-key that is pre-generated and stored on the eSE. The payment information can include the payment amount and at least one of a transaction date and time, a station entrance/exit flag, station information of a current transaction, a payment card number, or a credit limit. In some implementations, the credit payment APP can make corresponding changes to the entrance/exit flag, available balance, deduct the payment amount, store the station information of the current transaction and the transaction date and time, or store the digitally signed data and TAC. From 2612, method 2600 proceeds to 2614.

At 2614, a payment authorization encrypted using asymmetric key encryption is received from the mobile computing device. From 2614, method 2600 proceeds to 2616.

At 2616, the APP public key is used to decrypt the second payment authorization. From 2616, method 2600 proceeds to 2618.

At 2618, a transaction log is recorded if the payment authorization is successfully decrypted. In some implementations, the transaction log is sent to a credit payment authorization server to decrypt the TAC. The payment can then be received from the credit payment authorization server according to the payment amount if the TAC is successfully decrypted. As such, the payment registration or collection device does not need to be connected to the credit payment authorization server all the time. It can perform payment registration to generate the transaction log offline. A plurality of payments can be executed at once when the payment registration or collection device is connected to the credit payment server.

To enhance safety, in some implementations, when the mobile payments made by using method 2600 surpasses a predetermined number of payments, a predetermined amount, or a predetermined time interval, the mobile computing device that makes the payments may be required to go online for identity verification. After the mobile computing device passes the verification, a data update notification can be sent to the credit payment APP to reauthorize making credit payment reset relevant data such as the number of payments and payment amount. After 2618, method 2600 stops.

Implementations of the subject matter described in this specification can be implemented so as to realize particular advantages or technical effects. For example, implementations of the subject matter permit a public transportation payment collection device to securely accept payment offline. The payment collection device receives a payment request, requesting a public key certificate from the mobile computing device to retrieve a public key, and use the retrieved public key to verify a payment authorization encrypted by the mobile computing device. A transaction can be recorded if the payment authorization is successfully verified. The transaction log can be sent to a credit payment authorization server to execute the payment. Since the transaction log can be recorded offline, the payment collection or registration device at the public transportation station only need to connect to the credit payment authorization server periodically to execute a plurality of payments together. As such, mobile payments of public transportation can be more efficiently and securely performed.

The described methodology permits enhancement of transaction/data security of various mobile computing device and payment collection device. Participants in transactions using eSE embedded in mobile computing devices and payment collection device such as a public transportation gate scanner can be confident that short-range communications such as NFC and security measures including asymmetric key encryption can ensure secured offline credit payment.

Asymmetric key encryption can be used to enhance data security. A public key is stored in the eSE of mobile computing devices instead of public transportation payment collection device and can be retrieved only by request. A private key can be used to provide digital signature to payment information and generate TAC to further enhance payment security.

The described methodology can ensure the efficient usage of computer resources (for example, processing cycles, network bandwidth, and memory usage), through the efficient offline payment processing. At least these actions can minimize or prevent waste of available computer and network resources with respect to multiple parties in mobile transactions by reducing bandwidth occupancy between the payment collection device, the mobile computing device, and the server. Instead of the payment collection device needing to verify data with additional communication or transactions with the server in real-time, transactions can be depended upon as valid when the payment collection device is offline to avoid delays cost by network delays. The payment can be more quickly and securely recorded to improve user experience.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   determining, by an entrance control device of an access-controlled area, that the entrance control device is in an offline state in which a connection between the entrance control device and a credit payment authorization server has not been established;
   in response to determining that the entrance control device is in the offline state in which the connection between the entrance control device and the credit payment authorization server has not been established, repeatedly performing following payment registration operations by the entrance control device to record a plurality of transaction logs on a storage device associated with the entrance control device:
      receiving, at the entrance control device, a near-field communication signal from a mobile computing device;
      generating and sending, by the entrance control device, a credit payment request to a user account of a credit payment application (APP) installed on the mobile computing device;
      receiving, by the entrance control device, a payment response message from the mobile computing device;
      parsing, by the entrance control device, the payment response message to identify an APP public key license;
      verifying, by the entrance control device, using a pre-stored credit authorization public key, the APP public key license;
      determining, by the entrance control device, that the APP public key license is successfully verified;
      in response to determining that the APP public key license is successfully verified, retrieving, by the entrance control device, an APP public key from the APP public key license;
      calculating a payment amount based on the payment response message;
      generating and sending, by the entrance control device, a payment deduction request to the user account of the credit payment APP;
      receiving, by the entrance control device, a payment authorization encrypted using asymmetric key encryption from the mobile computing device;
      using the APP public key to decrypt the payment authorization;

determining that the payment authorization is successfully decrypted; and in response to determining that the payment authorization is successfully decrypted, recording a transaction log on the storage device;

determining, by the entrance control device, that the connection between the entrance control device and the credit payment authorization server has been established; and in response to determining that the connection between the entrance control device and the credit payment authorization server has been established, sending, by the entrance control device, the plurality of transaction logs that have been recorded based on performing the payment registration operations while the entrance control device is in the offline state to the credit payment authorization server that is configured to process each transaction log of the plurality of transaction logs and to issue a payment to the entrance control device according to the payment amount associated with each transaction log.

2. The computer-implemented method of claim 1, wherein the credit payment request includes a card information reading message for reading the APP public key license, the payment response message includes at least one of a payment card number, an available balance, a station entrance/exit flag, or last transaction information, and wherein the station entrance/exit flag indicates an entrance or exit status of a station and the last transaction information includes transaction date, transaction time, and station information.

3. The computer-implemented method of claim 2, further comprising rejecting the credit payment request if the card number is blacklisted, and the available balance is less than a transaction amount, or the station entrance/exit flag does not match the mobile computing device's entrance or exit status.

4. The computer-implemented method of claim 2, wherein the payment deduction request includes an information field indicating at least one of the payment amount, the transaction date, the transaction time, the station entrance/exit flag, or the station information of a current transaction.

5. The computer-implemented method of claim 1, wherein the payment authorization includes payment information encrypted by an APP private key and a transaction authentication code (TAC), and wherein the APP private key is stored in an embedded secure element (eSE) of the mobile computing device and the TAC is generated based on at least part of the payment information by using a TAC sub-key that is pre-generated and stored on the eSE.

6. The computer-implemented method of claim 5, wherein the payment information includes the payment amount and at least one of a transaction date and transaction time, a station entrance/exit flag, a station information of a current transaction, a payment card number, or a credit limit.

7. The computer-implemented method of claim 5, further comprising:

decrypting, by the credit payment authorization server and for each transaction log of the plurality of transaction logs, the TAC of the transaction log;

determining, by the credit payment authorization server, that the transaction log is successfully decrypted; and in response, issuing, by the credit payment authorization server and according to the payment amount, the payment to the entrance control device.

8. A non-transitory, computer-readable medium storing one or more instructions executable by a computer system to perform operations comprising:

determining, by an entrance control device of an access-controlled area, that the entrance control device is in an offline state in which a connection between the entrance control device and a credit payment authorization server has not been established;

in response to determining that the entrance control device is in the offline state in which the connection between the entrance control device and the credit payment authorization server has not been established, repeatedly performing following payment registration operations by the entrance control device to record a plurality of transaction logs on a storage device associated with the entrance control device:

receiving, at the entrance control device, a near-field communication signal from a mobile computing device;

generating and sending, by the entrance control device, a credit payment request to a user account of a credit payment application (APP) installed on the mobile computing device;

receiving, by the entrance control device, a payment response message from the mobile computing device;

parsing, by the entrance control device, the payment response message to identify an APP public key license;

verifying, by the entrance control device, using a pre-stored credit authorization public key, the APP public key license;

determining, by the entrance control device, that the APP public key license is successfully verified;

in response to determining that the APP public key license is successfully verified, retrieving, by the entrance control device, an APP public key from the APP public key license;

calculating a payment amount based on the payment response message;

generating and sending, by the entrance control device, a payment deduction request to the user account of the credit payment APP;

receiving, by the entrance control device, a payment authorization encrypted using asymmetric key encryption from the mobile computing device;

using the APP public key to decrypt the payment authorization;

determining that the payment authorization is successfully decrypted; and in response to determining that the payment authorization is successfully decrypted, recording a transaction log on the storage device;

determining, by the entrance control device, that the connection between the entrance control device and the credit payment authorization server has been established; and in response to determining that the connection between the entrance control device and the credit payment authorization server has been established, sending, by the entrance control device, the plurality of transaction logs that have been recorded based on performing the payment registration operations while the entrance control device is in the offline state to the credit payment authorization server that is configured to process each transaction log of the plurality of transaction logs and to issue a payment to the entrance control device according to the payment amount associated with each transaction log.

9. The non-transitory, computer-readable medium of claim 8, wherein the credit payment request includes a card information reading message for reading the APP public key license, the payment response message includes at least one of a payment card number, an available balance, a station entrance/exit flag, or last transaction information, and wherein the station entrance/exit flag indicates an entrance or exit status of a station and the last transaction information includes transaction date, transaction time, and station information.

10. The non-transitory, computer-readable medium of claim 9, further comprising one or more instructions to reject the credit payment request if the card number is blacklisted, and the available balance is less than a transaction amount, or the station entrance/exit flag does not match the mobile computing device's entrance or exit status.

11. The non-transitory, computer-readable medium of claim 9, wherein the payment deduction request includes an information field indicating at least one of the payment amount, the transaction date, the transaction time, the station entrance/exit flag, or the station information of a current transaction.

12. The non-transitory, computer-readable medium of claim 8, wherein the payment authorization includes payment information encrypted by an APP private key and a transaction authentication code (TAC), and wherein the APP private key is stored in an embedded secure element (eSE) of the mobile computing device and the TAC is generated based on at least part of the payment information by using a TAC sub-key that is pre-generated and stored on the eSE.

13. The non-transitory, computer-readable medium of claim 12, wherein the payment information includes the payment amount and at least one of a transaction date and transaction time, a station entrance/exit flag, a station information of a current transaction, a payment card number, or a credit limit.

14. The non-transitory, computer-readable medium of claim 12, wherein the operations further comprise:
    decrypting, by the credit payment authorization server and for each transaction log of the plurality of transaction logs, the TAC of the transaction log;
    determining, by the credit payment authorization server, that the transaction log is successfully decrypted; and
    in response, issuing, by the credit payment authorization server and according to the payment amount, the payment to the entrance control device.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    determining, by an entrance control device of an access-controlled area, that the entrance control device is in an offline state in which a connection between the entrance control device and a credit payment authorization server has not been established;
    in response to determining that the entrance control device is in the offline state in which the connection between the entrance control device and the credit payment authorization server has not been established, repeatedly performing following payment registration operations by the entrance control device to record a plurality of transaction logs on a storage device associated with the entrance control device:
        receiving, at the entrance control device, a near-field communication signal from a mobile computing device;
        generating and sending, by the entrance control device, a credit payment request to a user account of a credit payment application (APP) installed on the mobile computing device;
        receiving, by the entrance control device, a payment response message from the mobile computing device;
        parsing, by the entrance control device, the payment response message to identify an APP public key license;
        verifying, by the entrance control device, using a pre-stored credit authorization public key, the APP public key license;
        determining, by the entrance control device, that the APP public key license is successfully verified;
        in response to determining that the APP public key license is successfully verified, retrieving, by the entrance control device, an APP public key from the APP public key license;
        calculating a payment amount based on the payment response message;
        generating and sending, by the entrance control device, a payment deduction request to the user account of the credit payment APP;
        receiving, by the entrance control device, a payment authorization encrypted using asymmetric key encryption from the mobile computing device;
        using the APP public key to decrypt the payment authorization;
        determining that the payment authorization is successfully decrypted; and
        in response to determining that the payment authorization is successfully decrypted, recording a transaction log on the storage device;
    determining, by the entrance control device, that the connection between the entrance control device and the credit payment authorization server has been established; and
    in response to determining that the connection between the entrance control device and the credit payment authorization server has been established, sending, by the entrance control device, the plurality of transaction logs that have been recorded based on performing the payment registration operations while the entrance control device is in the offline state to the credit payment authorization server that is configured to process each transaction log of the plurality of transaction logs and to issue a payment to the entrance control device according to the payment amount associated with each transaction log.

16. The computer-implemented system of claim 15, wherein the credit payment request includes a card information reading message for reading the APP public key license, the payment response message includes at least one of a payment card number, an available balance, a station entrance/exit flag, or last transaction information, and wherein the station entrance/exit flag indicates an entrance or exit status of a station and the last transaction information includes transaction date, transaction time, and station information.

17. The computer-implemented system of claim 16, further comprising one or more operations to reject the credit payment request if the card number is blacklisted, and the available balance is less than a transaction amount, or the station entrance/exit flag does not match the mobile computing device's entrance or exit status.

18. The computer-implemented system of claim 16, wherein the payment deduction request includes an information field indicating at least one of the payment amount, the transaction date, the transaction time, the station entrance/exit flag, or the station information of a current transaction.

19. The computer-implemented system of claim 15, wherein the payment authorization includes payment information encrypted by an APP private key and a transaction authentication code (TAC), and wherein the APP private key is stored in an embedded secure element (eSE) of the mobile computing device and the TAC is generated based on at least part of the payment information by using a TAC sub-key that is pre-generated and stored on the eSE.

20. The computer-implemented system of claim 19, wherein the payment information includes the payment amount and at least one of a transaction date and transaction time, a station entrance/exit flag, a station information of a current transaction, a payment card number, or a credit limit.

* * * * *